(12) United States Patent
Senshu

(10) Patent No.: US 7,894,603 B2
(45) Date of Patent: Feb. 22, 2011

(54) RECORDING SYSTEM AND METHOD, RECORDING DEVICE AND METHOD, INPUT DEVICE AND METHOD, REPRODUCTION SYSTEM AND METHOD, REPRODUCTION DEVICE AND METHOD, RECORDING MEDIUM, AND PROGRAM

(75) Inventor: Susumu Senshu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1002 days.

(21) Appl. No.: 10/500,851

(22) PCT Filed: Oct. 28, 2003

(86) PCT No.: PCT/JP03/13752

§ 371 (c)(1),
(2), (4) Date: Jul. 16, 2004

(87) PCT Pub. No.: WO2004/046936

PCT Pub. Date: Jun. 3, 2004

(65) Prior Publication Data

US 2005/0144465 A1 Jun. 30, 2005

(30) Foreign Application Priority Data

Nov. 20, 2002 (JP) .............................. 2002-336754

(51) Int. Cl.
*H04N 7/167* (2006.01)
(52) U.S. Cl. ........................................ 380/200; 726/26
(58) Field of Classification Search ................. 380/200; 705/57
See application file for complete search history.

(56) References Cited

U.S. PATENT DOCUMENTS 6,289,102 B1 * 9/2001 Ueda et al. .................. 380/201

(Continued)

FOREIGN PATENT DOCUMENTS

JP 11-306677 11/1999

(Continued)

OTHER PUBLICATIONS

"5C Digital Transmission Content Protection White Paper", [online], Jul. 14, 1998, DTLA, [retrieved on Jan. 8, 2004], Retrieved from the Internet: <URL: http://www.dtcp.com/data/wp_spec.pdf>.

(Continued)

*Primary Examiner*—Kambiz Zand
*Assistant Examiner*—Peter Poltorak
(74) *Attorney, Agent, or Firm*—Oblon, Spivak, McClelland, Maier & Neustadt, L.L.P.

(57) ABSTRACT

A recording system and method, a recording apparatus and method, an input device and method, a playback system and method, a playback apparatus and method, a recording medium, and a program in which content can be flexibly protected according to whether the content should be protected. When mutual authentication is conducted with an AV board by a mutual authentication unit and when the content input into the mutual authentication unit is encrypted with a common key, an input/output controller determines that the content to be input via a bus is to be protected on the bus. The input/output controller then controls a recording/playback processor to generate protection information, indicating that the content is to be protected on the bus, and records the generated protection information on an optical disc together with the content.

17 Claims, 33 Drawing Sheets

U.S. PATENT DOCUMENTS

| | | | |
|---|---|---|---|
| 6,522,609 B2 * | 2/2003 | Nakane et al. | 369/53.17 |
| 6,584,552 B1 | 6/2003 | Kuno et al. | |
| 6,778,969 B2 * | 8/2004 | Oshima et al. | 705/57 |
| 6,952,479 B2 * | 10/2005 | Shavit et al. | 380/201 |
| 7,107,461 B2 * | 9/2006 | Magoshi | 713/193 |
| 7,286,746 B1 * | 10/2007 | Ando et al. | 386/52 |
| 7,310,823 B2 * | 12/2007 | Okamoto et al. | 726/31 |
| 2002/0157055 A1 * | 10/2002 | Coene et al. | 714/758 |
| 2003/0081786 A1 * | 5/2003 | Nakano et al. | 380/277 |
| 2003/0206509 A1 * | 11/2003 | Lee et al. | 369/53.15 |

FOREIGN PATENT DOCUMENTS

| | | |
|---|---|---|
| JP | 2000-187935 | 7/2000 |
| JP | 2000-285027 | 10/2000 |
| JP | 2000-339851 | 12/2000 |
| JP | 2002-24095 | 1/2002 |
| JP | 2002-84271 | 3/2002 |
| JP | 2002-132457 | 5/2002 |

OTHER PUBLICATIONS

"5C Digital Transmission Content Protection White Paper", [online], Jul. 14, 1998, DTLA, [retrieved on Jan. 8, 2004], Retrieved from the internet: <URL: http//www/dtcp.co,/data/wp_spec.pdf>.

* cited by examiner

FIG. 11A

| VERSION(Version):t | |
|---|---|
| INDEX | ENCRYPTED KEY |
| 0 | Enc(K(t)0,K(t)R) |
| 00 | Enc(K(t)00,K(t)0) |
| 000 | Enc(K000,K(t)00) |
| 001 | Enc(K(t)001,K(t)00) |
| 0010 | Enc(K0010,K(t)001) |

FIG. 11B

| VERSION(Version):t | |
|---|---|
| INDEX | ENCRYPTED KEY |
| 000 | Enc(K000,K(t)00) |
| 001 | Enc(K(t)001,K(t)00) |
| 0010 | Enc(K0010,K(t)001) |

RECORDING SYSTEM AND METHOD, RECORDING DEVICE AND METHOD, INPUT DEVICE AND METHOD, REPRODUCTION SYSTEM AND METHOD, REPRODUCTION DEVICE AND METHOD, RECORDING MEDIUM, AND PROGRAM

TECHNICAL FIELD

The present invention relates to recording systems and methods, recording apparatuses and methods, input devices and methods, playback systems and methods, playback apparatuses and methods, recording media, and programs. More particularly, the invention relates to a recording system and method, a recording apparatus and method, an input device and method, a playback system and method, a playback apparatus and method, a recording medium, and a program in which content can be flexibly protected based on whether or not the content should be protected.

BACKGROUND ART

In a recording/playback apparatus (for example, a CD-RW drive), when recording or playing back content on or from a disc, it is demanded for protecting the content that recording/playback operations be correctly controlled and unauthorized copying be prevented.

For example, published Japanese translations of PCT international publication for patent application No. 2002-521789 discloses that data is recorded or played back on or from discs by using a data format consisting of user data and user control data.

In such a data format, the user data is recorded after being encrypted with a key by using the disc ID unique to a disc, thereby protecting content from unauthorized copying.

Japanese Unexamined Patent Application Publication No. 2002-84271 discloses a recording/playback apparatus 1 shown in FIG. 1.

In the example shown in FIG. 1, the recording/playback apparatus 1 is formed of a drive 11 an AV board 12, and a dedicated bus 13. The drive 11 includes a recording/playback processor 21, and the AV board 12 includes an AV content processor 31, a content protector 32, an input unit 33, and an output unit 34.

When an optical disc 41 is loaded, the recording/playback processor 21 obtains the disc ID and RKB (Renewal Key Block) unique to the optical disc 41, and supplies them to the content protector 32 of the AV board 12 via the dedicated bus 13. The content protector 32 generates a key by using a disc key obtained from the disc ID and RKB, and stores the generated key.

The AV content processor 31 supplies content with a copyright (i.e., such content should be protected) received via the input unit 33, for example, an antenna, to the content protector 32. The content protector 32 encrypts the content with the prestored key by using the disc key obtained from the disc ID and RKB, and supplies the encrypted content to the recording/playback processor 21 via the dedicated bus 13 as the content to be protected. The recording/playback processor 21 receives the encrypted content and records it on the optical disc 41.

The recording/playback processor 21 also plays back predetermined encrypted content from the optical disc 41, and supplies the content to the content protector 32 via the dedicated bus 13. The content protector 32 decrypts the encrypted content with a key by using the disc key obtained from the disc ID and RKB, and supplies the content to the AV content processor 31. The AV content processor 31 decodes the decrypted content according to, for example, an MPEG (Moving Picture Experts Group) and plays back the content. The output unit 34 outputs the played back content.

As described above, since data is sent and received between the drive 11 and the AV board 12 via the dedicated bus 13 in the recording/playback apparatus 1, content can be protected from external access by using the disc ID or RKB.

As a modified example of the recording/playback apparatus 1 shown in FIG. 1, a recording/playback apparatus 51 shown in FIG. 2 can be considered. In FIG. 2, the elements corresponding to the elements shown in FIG. 1 are designated with like reference numerals, and an explanation thereof is thus omitted. In the example shown in FIG. 2, the drive 11 and the AV board 12 are separated via a bus 61 (general-purpose bus) (for example, they are separated by a household LAN (Local Area Network)).

Accordingly, in the example shown in FIG. 2, since the disc ID and RKB are directly sent to the bus 61, there is a possibility of the disc ID and RKB being stolen. For example, when connecting an HDD (Hard Disk Drive) 71 to the bus 61 for recording content, the "disc ID", "RKB", and "content encrypted with a disc key obtained from the disc ID and the RKB" on the bus 61 are sent (monitored) and copied into the HDD 71.

In the example shown in FIG. 2, in the HDD 71, a 16-B disc ID, a several-MB RKB, 20-GB encrypted content, and a several-KB program which are sent to the HDD 71 as described above are stored. If the "disc ID", "RKB", and "content encrypted with the disc key obtained from the disc ID and RKB" are supplied to the AV board 12 from the HDD 71, the AV board disadvantageously plays back the content since it cannot distinguish them from those played back by the authorized optical disc 41.

A "spoofing drive" or a "spoofing program", which supplies the "disc ID", "RKB", and "content encrypted with the disc key obtained from the disc ID and RKB" to the AV board 12 may be disadvantageously distributed as a general playback execution apparatus or program.

Accordingly, in the recording/playback apparatus 51 in which the drive 11 and the AV board 12 are separated from each other via the bus 61, data may be distributed, not only to authorized discs, but also to unauthorized media, for example, the HDD 71.

Accordingly, a recording/playback apparatus 81 which conducts mutual authentication, such as that shown in FIG. 3, has been proposed. In the example shown in FIG. 3, a mutual authentication unit 91 is provided for the drive 11, and a mutual authentication unit 92 is provided for the AV board 12. By conducting mutual authentication processing between the two mutual authentication units 91 and 92, content can be sent and received by being encrypted with a common key shared by the drive 11 and the AV board 12.

Accordingly, in the HDD 71 without a mutual authentication function and compatible with optical discs recorded by the recording/playback 1 or 51, even if the "disc ID", "RKB", and "content encrypted with the disc key obtained from the disc ID and RKB" are copied, they cannot be decrypted, thereby making copying substantially impossible in the HDD 71. Thus, the above-described "spoofing drive" or "spoofing program" can be prevented.

Recently, however, for superdistribution in which encrypted content is provided free of charge, or for storing content in a PC (Personal Computer), it is demanded that content that does not have to be protected can be recorded or played back without being encrypted on the bus 13 so as to allow the user to copy such content. On the other hand, it is also demanded that content that should be protected be prevented from being copied.

At present, however, since the HDD 71 of an ordinary PC is not provided with a mutual authentication function, in the recording/playback apparatus 81, not only specific content to be protected, but also content that does not have to be protected but to be stored in a PC, cannot be copied.

DISCLOSURE OF INVENTION

In view of the above background, it is an object of the present invention to flexibly protect content based on whether or not the content should be protected.

According to a recording system of the present invention, an input device includes determination means for determining whether input content is to be protected, and a recording apparatus includes recording means for recording on a recording medium, together with the content, protection information indicating whether the content is to be protected when being transmitted on the bus based on a determination result obtained by the determination means.

The recording means may record the protection information in predetermined units of the content.

The predetermined unit may be 2048 bytes.

The recording apparatus may further include encryption means for encrypting the content by using an ID and a recording medium key of the recording medium when the determination means determines that the content is to be protected.

The recording apparatus may further include encryption means for encrypting the content by using at least a recording medium key of the recording medium when the determination means determines that the content is not to be protected.

Each of the input device and the recording apparatus may further include authentication means for authenticating each other.

The input device may further include first encryption means for encrypting the content before being sent to the bus when the determination means determines that the content is to be protected. The recording apparatus may further include second encryption means for encrypting the content before being recorded by the recording means when the determination means determines that the content is to be protected.

The first encryption means may prohibit the content from being encrypted before being sent to the bus when the determination means determines that the content is not to be protected.

According to a first recording method of the present invention, an input device determines whether input content is to be protected, and a recording apparatus records on a recording medium, together with the content, protection information indicating whether the content is to be protected when being transmitted on the bus based on a determination result.

A recording apparatus of the present invention includes: authentication means for conducting mutual authentication with a first apparatus connected to the recording apparatus via a bus; decryption means for decrypting content encrypted with a first encryption method and supplied from the first apparatus via the bus; and recording means for recording on the recording medium, together with the content decrypted by the decryption means, protection information indicating that the content is to be protected when being transmitted on the bus.

The recording apparatus may further include encryption means for encrypting the decrypted content with a second encryption method.

The encryption means may encrypt the decrypted content by using an ID and a recording medium key of the recording medium.

The recording means may record the content together with protection information indicating that the content is not to be protected when being transmitted on the bus when the content supplied from the first apparatus via the bus is not encrypted with the first encryption method.

A second recording method of the present invention includes: an authentication step of conducting mutual authentication with a first apparatus connected to a recording apparatus via a bus; a decryption step of decrypting encrypted content supplied from the first apparatus via the bus; and a recording step of recording on a recording medium, together with the content decrypted by processing of the decryption step, protection information indicating that the content is to be protected when being transmitted on the bus.

A program of a first recording medium of the present invention includes: an authentication step of conducting mutual authentication with a first apparatus connected to a recording apparatus via a bus; a decryption step of decrypting encrypted content supplied from the first apparatus via the bus; and a recording step of recording on a recording medium, together with the content decrypted by processing of the decryption step, protection information indicating that the content is to be protected when being transmitted on the bus.

A first program of the present invention includes: an authentication step of conducting mutual authentication with a first apparatus connected to a recording apparatus via a bus; a decryption step of decrypting encrypted content supplied from the first apparatus via the bus; and a recording step of recording on a recording medium, together with the content decrypted by processing of the decryption step, protection information indicating that the content is to be protected when being transmitted on the bus.

An input device of the present invention includes: authentication means for conducting mutual authentication with a recording apparatus connected to the input device via a bus; first encryption means for encrypting the content with a first encryption method according to whether the input content is to be protected when being transmitted on the bus; and supply means for supplying the content encrypted by the first encryption means to the recording apparatus via the bus.

The input device may further include second encryption means for encrypting the content encrypted by the first encryption means with a second encryption method.

One of the first encryption means and the second encryption means may encrypt the content by using an ID and a recording medium key of a recording medium.

An input method of the present invention includes: an authentication step of conducting mutual authentication with a recording apparatus connected to an input device via a bus; an encryption step of encrypting content according to whether the input content is to be protected when being transmitted on the bus; and a supply step of supplying the content encrypted by processing of the encryption step to the recording apparatus via the bus.

A program of a second recording medium of the present invention includes: an authentication step of conducting mutual authentication with a recording apparatus connected to an input device via a bus; an encryption step of encrypting content according to whether the input content is to be protected when being transmitted on the bus; and a supply step of supplying the content encrypted by processing of the encryption step to the recording apparatus via the bus.

A second program of the present invention includes: an authentication step of conducting mutual authentication with a recording apparatus connected to an input device via a bus; an encryption step of encrypting content according to whether the input content is to be protected when being transmitted on the bus; and a supply step of supplying the content encrypted by processing of the encryption step to the recording apparatus via the bus.

According to a playback system of the present invention, a playback apparatus includes: playback means for playing back from a recording medium content and protection information indicating whether the content is to be protected when being transmitted on the bus; and transmission control means for controlling the transmission of the content to an output device on the bus based on the protection information played back by the playback means. The output device includes output means for outputting the content transmitted by the transmission control means to an external source.

The protection information may be recorded in predetermined units of the content.

The predetermined unit may be 2048 bytes.

The playback apparatus may further include decoding means for decoding the content played back by the playback means.

The playback apparatus may further include authentication means for authenticating the device on the bus.

The playback apparatus may further include encryption means for encrypting the content before being sent to the bus when the protection information indicates that the content is to be protected when being transmitted to the bus and when the output device on the bus is authenticated by the authentication means. The output device may further include first decryption means for decrypting the content encrypted by the encryption means.

The output device may further include second decryption means for decrypting the content decrypted by the first decryption means by using an ID and a recording medium key of the recording medium.

The transmission control means may prohibit the content from being transmitted to the device on the bus when the protection information indicates that the content is to be protected when being transmitted on the bus and when the device on the bus is not authenticated by the authentication means.

According to a first playback method of the present invention, a playback apparatus plays back from a recording medium content and protection information indicating whether the content is to be protected when being transmitted on the bus, and controls the transmission of the content to an output device on the bus based on the played back protection information, and the output device outputs the content transmitted from the playback apparatus to an external source.

A playback apparatus of the present invention includes: playback means for playing back from a recording medium content and protection information indicating whether the content is to be protected when being transmitted on a bus; and output control means for controlling the output of the content to a first apparatus via the bus based on the protection information played back by the playback means.

The protection information may be recorded in predetermined units of the content.

The predetermined unit may be 2048 bytes.

The playback apparatus may further include: authentication means for authenticating the first apparatus; and encryption means for encrypting the content. The encryption means may encrypt the content before being sent to the bus when the protection information indicates that the content is to be protected when being transmitted on the bus and when the first apparatus is authenticated by the authentication means.

The output control means may prohibit the content from being output to the bus when the protection information indicates that the content is to be protected when being transmitted on the bus and when the first apparatus is not authenticated by the authentication means.

A second playback method of the present invention includes: a playback step of playing back from a recording medium content and protection information indicating whether the content is to be protected when being transmitted on the bus; and an output control step of controlling the output of the content to a first apparatus via a bus based on the protection information played back by processing of the playback step.

A program of a third recording medium of the present invention includes: a playback step of playing back from the recording medium content and protection information indicating whether the content is to be protected when being transmitted on the bus; and an output control step of controlling the output of the content to a first apparatus via a bus based on the protection information played back by processing of the playback step.

A third program of the present invention includes: a playback step of playing back from a recording medium content and protection information indicating whether the content is to be protected when being transmitted on the bus; and an output control step of controlling the output of the content to a first apparatus via a bus based on the protection information played back by processing of the playback step.

In the first invention, the input device determines whether input content is to be protected, and the recording apparatus records on a recording medium, together with the content, protection information indicating whether the content is to be protected when being transmitted on a bus based on a determination result.

The input device may be an independent device, or may be a block for performing input processing in an input recording apparatus.

The recording apparatus may be an independent apparatus, or may be a block for performing recording processing in a recording/playback apparatus.

In the second invention, mutual authentication is conducted with a first apparatus connected via a bus. Encrypted content supplied from the first apparatus via the bus is then decrypted, and protection information indicating that the content is to be protected when being transmitted on the bus is recorded on a recording medium together with the decrypted content.

In the third invention, mutual authentication is conducted with a recording apparatus connected via a bus. Content is then encrypted according to whether the input content is to be protected when being transmitted on the bus, and the encrypted content is supplied to the recording apparatus via the bus.

In the fourth invention, content and protection information indicating whether the content is to be protected when being transmitted on a bus are played back from a recording medium by a playback apparatus. Based on the played back protection information, the transmission of the content to an output device on the bus is controlled. The content supplied from the playback apparatus is then output to an external source by the output device.

The playback apparatus may be an independent apparatus, or may be a block for performing playback processing in a recording/playback apparatus.

The output device may be an independent device, or may be a block for performing output processing in a playback output apparatus.

In the fifth invention, content and protection information indicating whether the content is to be protected when being transmitted on a bus are played back from a recording medium. Based on the played back protection information, the output of the content to another apparatus via the bus is controlled.

BRIEF DESCRIPTION OF THE DRAWINGS

FIG. 11A illustrates an example of an RKB used for the disc key of the present invention.

FIG. 11B illustrates an example of an RKB used for the disc key of the present invention.

BEST MODE TO CARRY OUT THE INVENTION

An embodiment of the present invention is described below with reference to the drawings.

Figure 1:
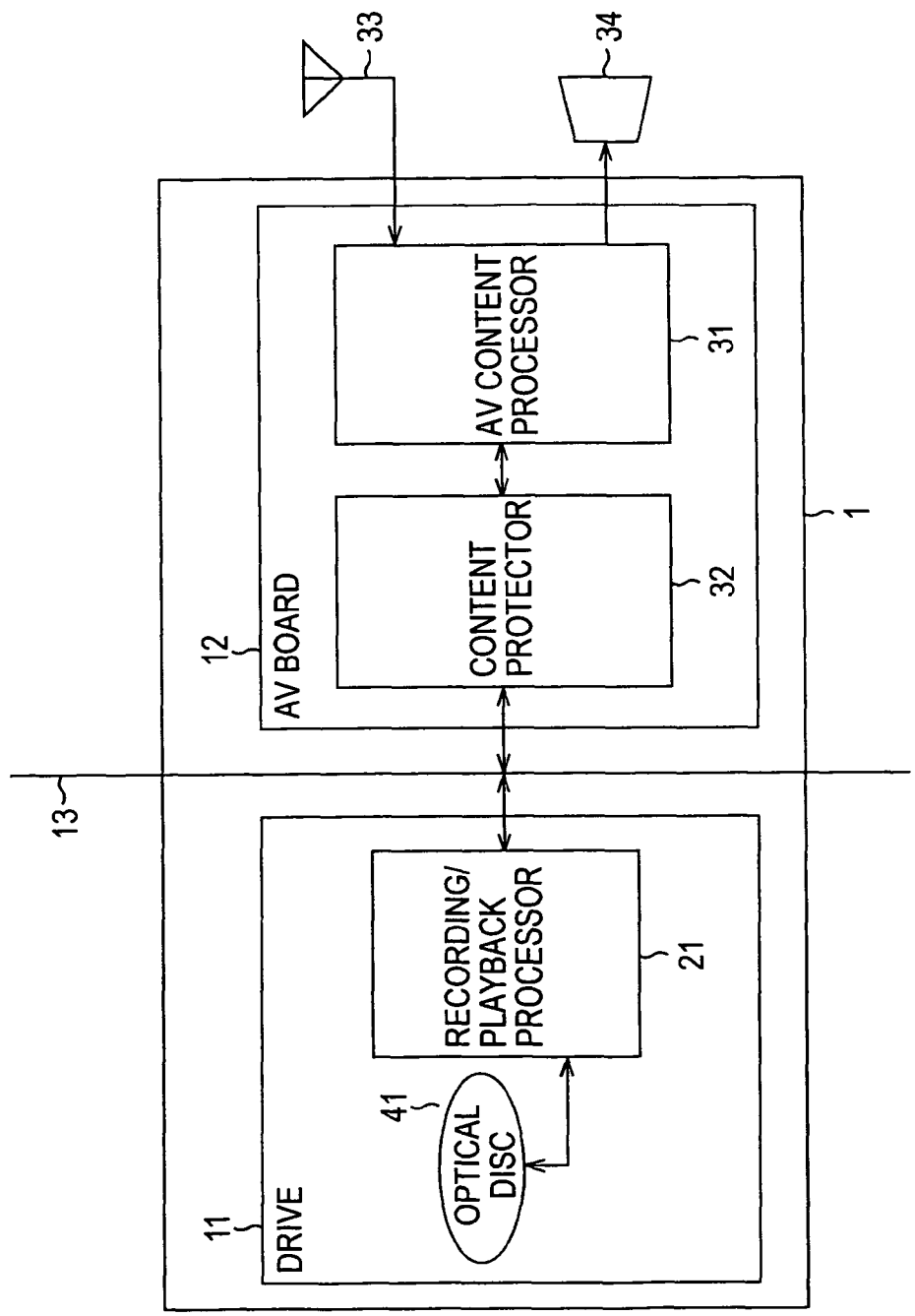
FIG. 1 is a block diagram illustrating an example of the configuration of a known recording/playback apparatus.
Figure 2:
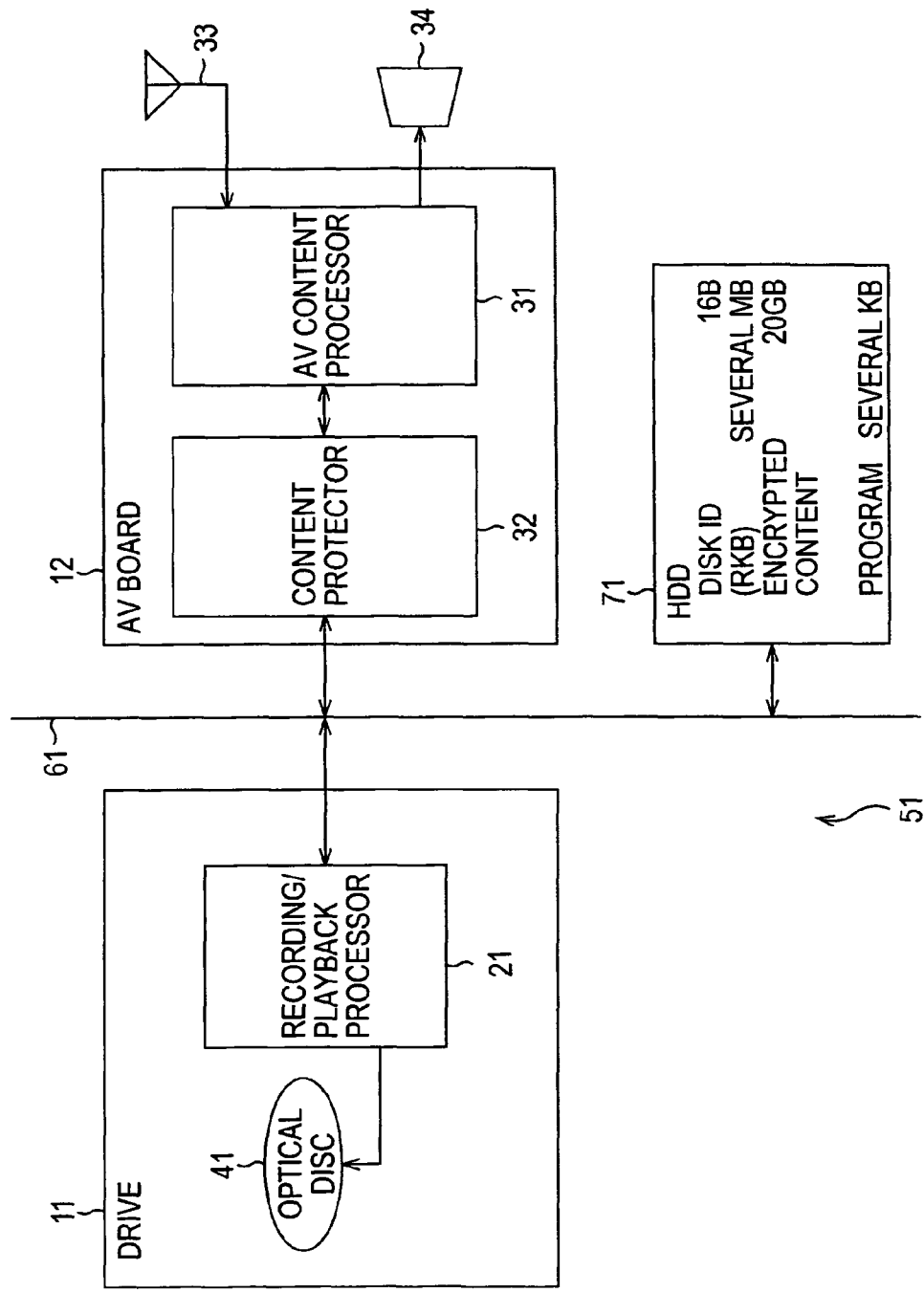
FIG. 2 is a block diagram illustrating another example of the configuration of a known recording/playback apparatus.
Figure 3:
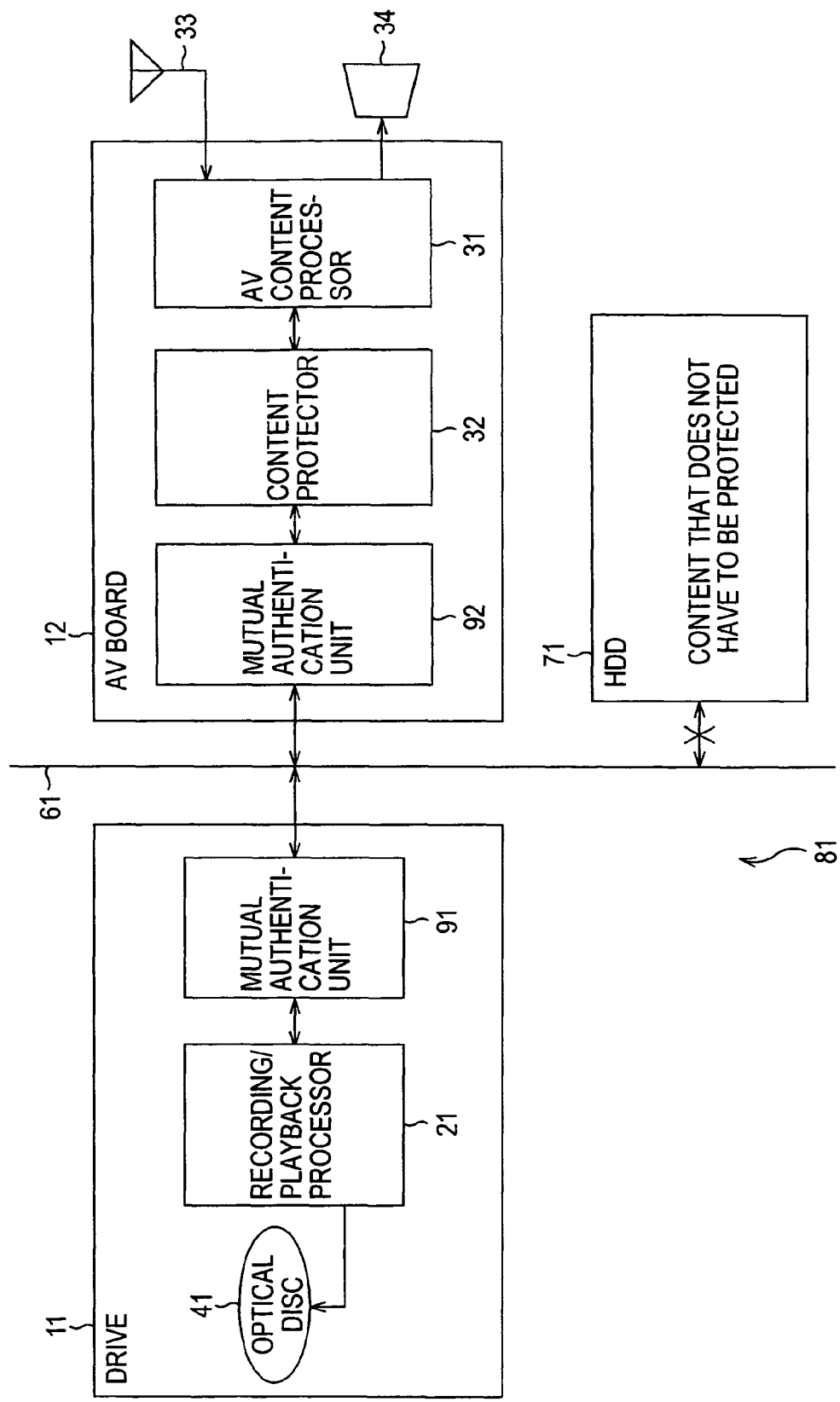
FIG. 3 is a block diagram illustrating still another example of the configuration of a known recording/playback apparatus.
Figure 4:
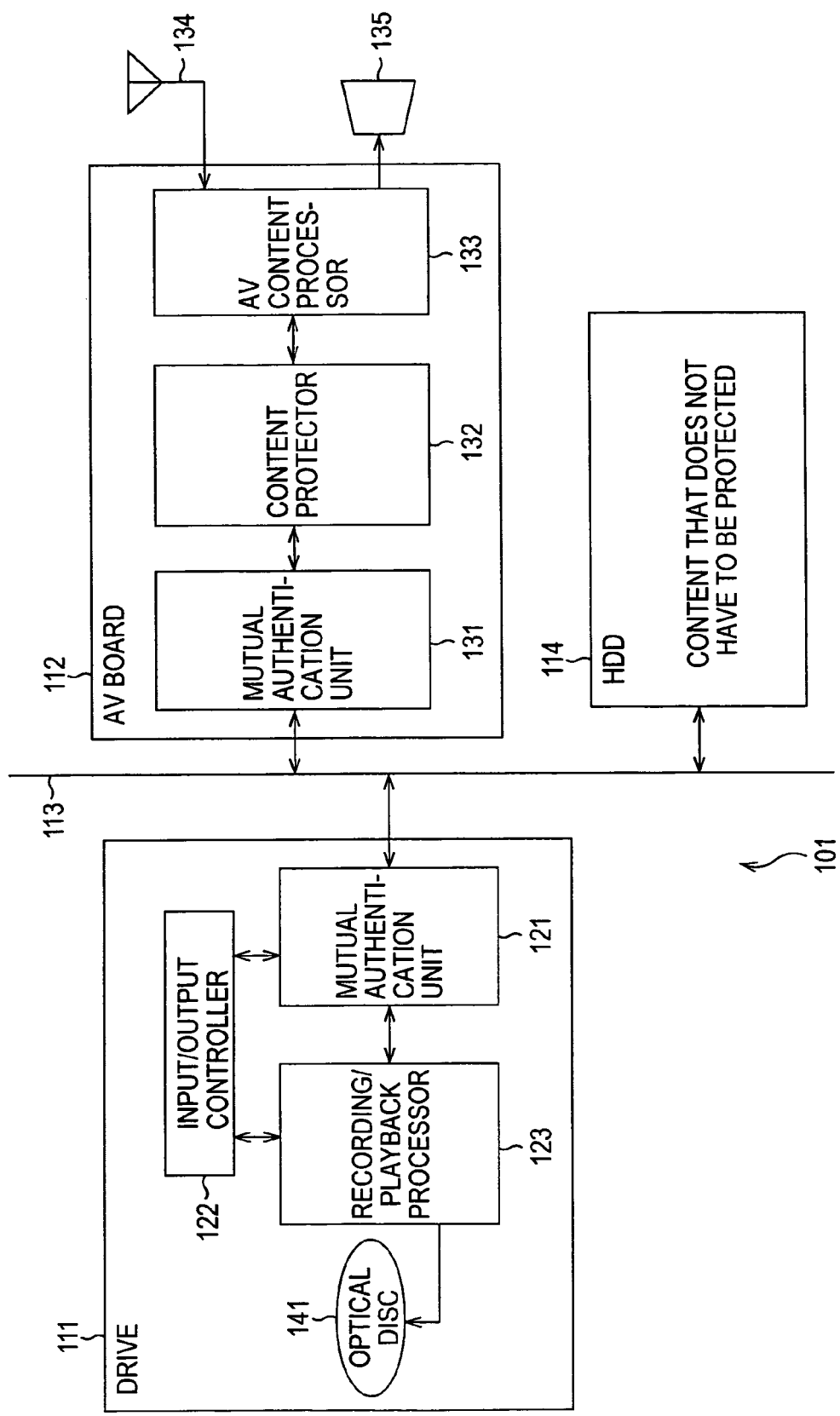
FIG. 4 is a block diagram illustrating an example of the configuration of a recording/playback apparatus to which the present invention is applied.

FIG. 4 illustrates an example of the configuration of a recording/playback apparatus 101 to which the present invention is applied. A drive 111, an AV board 112, and an HDD (hard disk drive) 114 are connected to a bus 113, a typical example of which is a household LAN (Local Area Network). It should be noted that the drive 111, the AV board 112, and the HDD 114 are separately sold, and these elements are then connected to the bus 113 by a user.

In this example, the drive 111 and the AV board 112 are each provided with the corresponding private key and the public key. The public key and the private key have been registered when, for example, the drive 111 and the AV board 112 were shipped by manufacturers. The public key is stored in a digital signature issued by a certificate authority (not shown). Content is transferred between the drive 111 and the AV board 112 by using a public key cryptosystem, for example, RSA. Between the private key and the corresponding public key, ciphertext generated based on one of the keys can be decrypted by using the other key.

The drive 111 includes a mutual authentication unit 121 for conducting mutual authentication with other devices (the AV board 112 in the example shown in FIG. 4), an input/output controller 122 for controlling the elements of the drive 111, and a recording/playback processor 123 for recording or playing back content on or from an optical disc 141 loaded in the drive 111.

The AV board 112 includes a mutual authentication unit 131 for conducting mutual authentication with other devices (the drive 111 in the example shown in FIG. 4), a content protector 132 for encrypting content to be stored in the optical disc 141, and an AV processor 133 for receiving content via an input unit 134, for example, an antenna, or for decoding content and outputting it to an output unit 135.

The mutual authentication unit 121 of the drive 111 conducts mutual authentication with the mutual authentication unit 131 of the AV board 112. More specifically, when the drive 111 and the AV board 112 are connected to turn on the power of the two devices, the mutual authentication unit 131 of the AV board 112 generates a common key based on random numbers of a built-in random number generator (not shown) and encrypts the generated common key with the public key of the drive 111 so as to generate a signature to the common key encrypted with the private key of the AV board 112. The mutual authentication unit 131 reads an AV-board digital certificate that has been obtained from a certificate authority and stored in a built-in memory, and sends the encrypted common key, the signature added to the common key by the AV board 112, and the AV-board digital certificate to the drive 111 via the bus 113.

Upon receiving the above-described elements, the mutual authentication unit 121 of the drive 111 decrypts the encrypted common key with the private key of the drive 111 to obtain the common key (first common key), and also decrypts the AV-board digital certificate with the public key of the certificate authority obtained from the certificate authority so as to verify that the AV board 112 is an authorized AV board. The mutual authentication unit 121 also decrypts the signature added to the common key with the public key of the AV board 112 obtained from the decrypted AV-board digital certificate so as to obtain the common key (second common key). The mutual authentication unit 121 of the drive 111 compares the first common key with the second common key, and when they are found to be equal to each other, the mutual authentication unit 121 determines that the common key has not been tampered with on the bus 113. Then, the common key can be shared between the drive 111 and the AV board 112.

As described above, the mutual authentication unit 121 of the drive 111 performs mutual authentication with the mutual authentication unit 131 of the AV board 112 so as to authenticate the AV board 112. Then, the mutual authentication units 121 and 131 can encrypt and send content, and decrypt the received content by using the common key.

On the other hand, the HDD 114 does not have a mutual authentication function, such as the mutual authentication unit 131 of the AV board 112. Accordingly, the HDD 114 can send and receive free content (content that does not have to be protected), which can be transmitted to the bus 113 without any problem, to and from the drive 111.

Upon receiving a broadcast signal (corresponding to encrypted or scrambled content) via the input unit 134, the AV content processor 133 of the AV board 112 decodes the encrypted or scrambled content with a prestored key (key shared with a device which receives the broadcast signal) and supplies the content to the content protector 132.

The AV content processor 133 determines whether the input content should be protected based on whether or not the input content is encrypted or scrambled. If, for restricting the copying of the content, CCI (Copy Control Information), for example, a CGMS (Copy Generation Management System) signal, indicating "Copy Free (copying is allowed)", "Copy Once (copying is allowed only for one generation", "No More Copy (copying is not allowed further than this generation", or "Copy Prohibited (copying is not allowed)", is added to this content (broadcast signal), the above-described determination may be made as follows. When this copy generation management information indicates "Copy Free", the input content may be determined as content that does not have to be protected, and when the copy generation management information indicates "Copy Once", "No More Copy", or "Copy Prohibited", the input content may be determined as content that should be protected.

If the content input from the AV content processor 133 is found to be content that should be protected by the AV content processor 133, the content protector 132 obtains the disc key by using the RKB of the optical disc 141 supplied from the mutual authentication unit 131 so as to generate a block key based on the disc key and the disc ID of the optical disc 141. The content protector 132 encrypts the content which should be protected on the optical disc 141 and supplies the encrypted content to the encryption authentication unit 131.

The mutual authentication unit 131 encrypts the content, which has been encrypted by the content protector 132, by using the common key shared with the drive 111 in order to protect the content on the bus 113, and outputs the encrypted content to the drive 111 via the bus 113.

If the content is found to be content that does not have to be protected by the AV content processor 133, the content protector 132 and the mutual authentication unit 131 output the content to the drive 111 via the bus 113 without encrypting it.

The mutual authentication unit 121 of the drive 111 receives the content from the AV board 112 via the bus 113. If the received content is encrypted, the mutual authentication unit 121 decrypts the content with the common key shared with the drive 111 and supplies the decrypted content to the recording/playback processor 123.

The input/output controller 122 determines whether the content input into the mutual authentication unit 121 should be protected on the bus 113 based on whether the content is encrypted with the common key shared with the AV board 112 by the mutual authentication unit 131 of the AV board 112 (that is, whether the AV content processor 133 has determined whether the content should be protected). The input/output controller 122 then controls the recording of the content by the recording/playback processor 123 based on whether the input content should be protected on the bus 113 and whether the mutual authentication unit 121 has conducted mutual authentication with the AV board 112.

The input/output controller 122 also controls the recording/playback processor 123 to play back disc information, such as the disc ID and RKB (Renewal Key Block), recorded on the optical disc 141 based on whether the input content should be protected and whether the mutual authentication unit 121 has conducted mutual authentication with the AV board 112.

When recording the content on the optical disc 141, the recording/playback processor 123 generates protection information indicating whether or not the content to be recorded should be protected on the bus 113 based on an instruction from the input/output controller 122, and records the protection information on the optical disc 141 together with the content.

Figure 5:
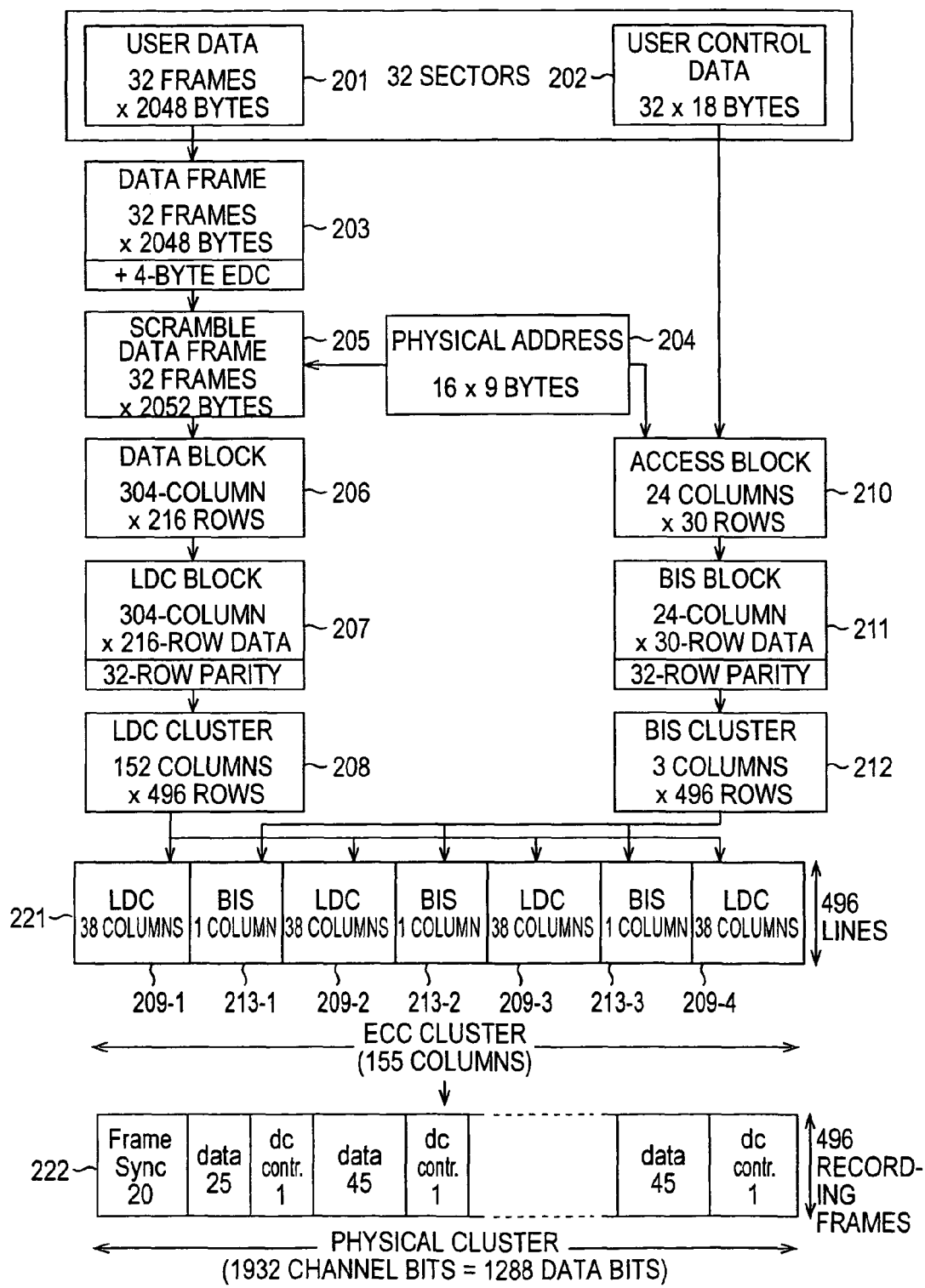
FIG. 5 illustrates an example of the configuration of the data format used in the present invention.

FIG. 5 illustrates an example of the configuration of a data format to be recorded on the optical disc 141.

In this data format, user data 201 for 32 frames, each frame having 2K (2048) bytes, and user control data 202 for 32 frames, each frame having 18 bytes, so as to form 32 sectors.

The user data 201 is formed of content data. In this user data 201, four (4-byte) EDCs (error detecting codes) are added to each frame so as to form a data frame 203 shown in FIG. 6.

Figure 6:
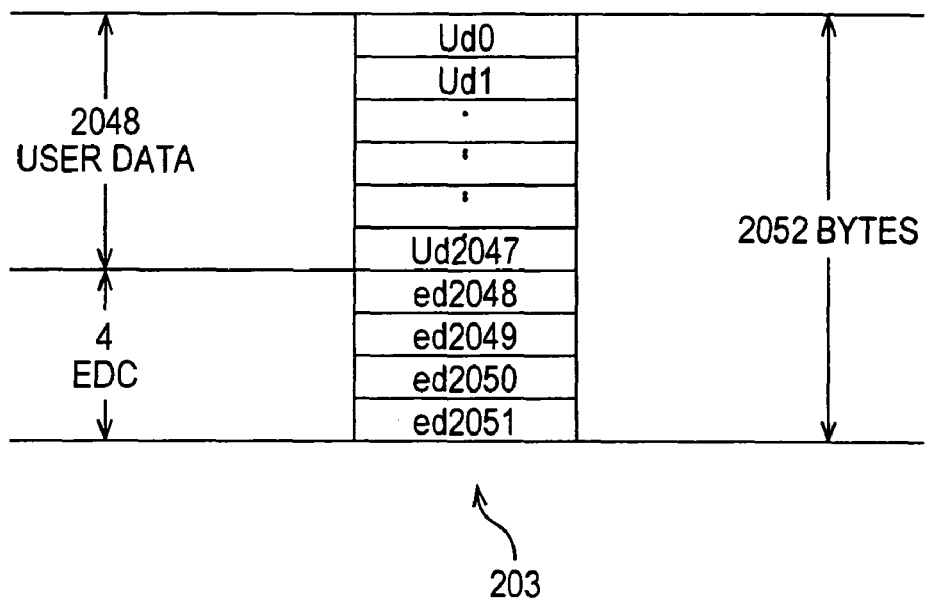
FIG. 6 illustrates an example of the configuration of the data frame shown in FIG. 5.

In the example shown in FIG. 6, one data frame has 2052 bytes. More specifically, one data frame consists of 2048 user data bytes having numbers Ud0 through Ud2047 and four EDCs having numbers ed2048 through ed2051.

Figure 7:
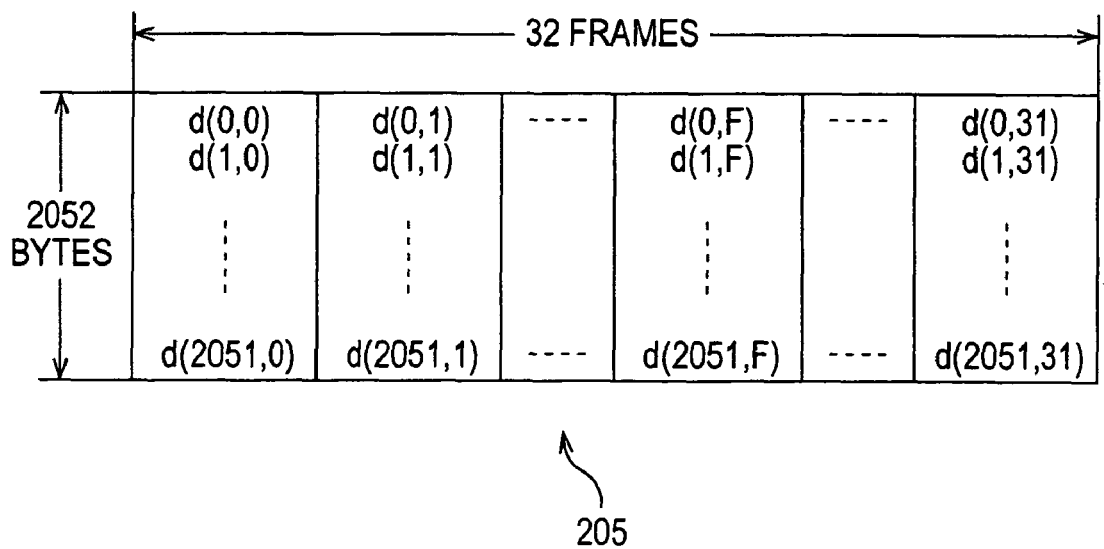
FIG. 7 illustrates an example of the configuration of the scramble data frame shown in FIG. 5.

This data frame 203 forms a scramble data frame 205 shown in FIG. 7 based on a 16×9-byte physical address 204, the scramble data 205 consisting of 32 data frames 203.

In the example in FIG. 7, the first frame (the leftmost column in FIG. 7) has 2052 bytes having numbers d(0, 0), d(1, 0), ..., and d(2051, 0). The second frame (the second column from the left in FIG. 7) has 2052 bytes having numbers d(0, 1), d(1, 1), ..., and d(2051, 1). Similarly, the (F-1)-th frame has 2052 bytes having numbers d(0, F), d(1, F), ..., and d(2051, F), and the 32-th frame (the rightmost column in FIG. 7) has 2052 bytes having numbers d(0, 31), d(1, 31), . . . , and d(2051, 31).

From the above-described scramble data frame 205, 216-row×304-column data block 206 is formed. By adding 32-row parity to the data block 206, an LDC (long distance code: error correction) block 207 is formed. From the LDC block 207, a 496-row×152-column LDC cluster 208 is formed. The LDC cluster 208 is divided into four LDC blocks, each having 38 columns, 209-1 through 209-4, which form an ECC cluster 221 with BIS blocks 213-1 through 213-3, which are described below.

Addresses and control data to be added by this recording/playback apparatus 101 are as follows. The user control data (logical address and control data) 202 is arranged as 32×18 bytes, as shown in FIG. 8.

Figure 8:
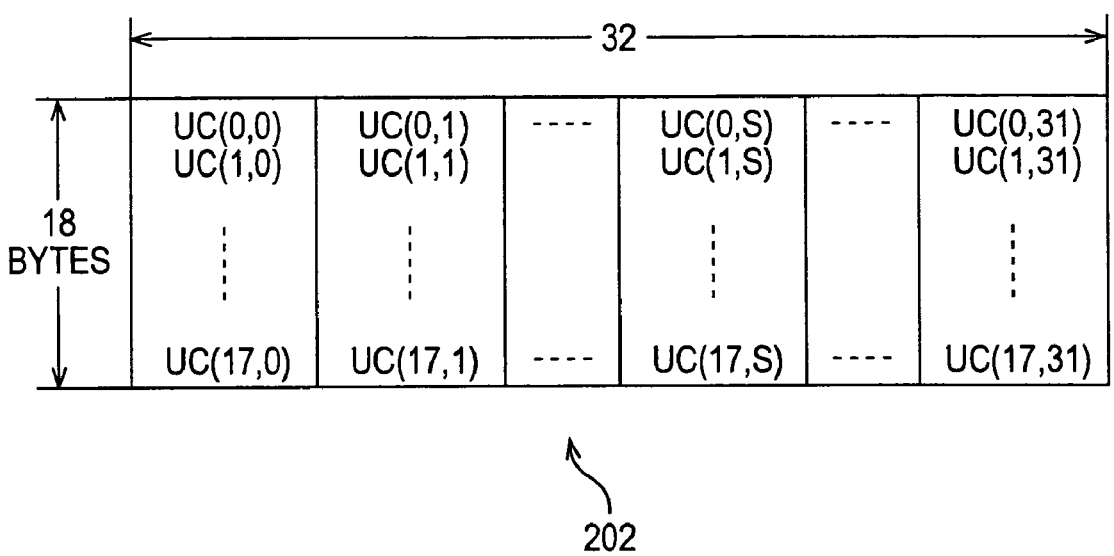
FIG. 8 illustrates an example of the configuration of the user control data shown in FIG. 5.

In the example shown in FIG. 8, the first (the leftmost column in FIG. 8) frame has 18 bytes having numbers UC(0, 0), UC(1, 0), . . . , UC(17, 0). The second (the second column from the left in FIG. 8) frame has 18 bytes having numbers UC(0, 1), UC(1, 1), . . . , UC(17, 1). Similarly, the (S-1)-th frame has 18 bytes having numbers UC(0, S), UC(1, S), UC(17, S). The 32-th (the rightmost column in FIG. 8) frame has 2052 bytes having numbers UC(0, 31), UC(1, 31), UC(17, 31).

As discussed above, in this data format, the 18-byte user control data 202 corresponds to the 2K(2048)-byte user data 201 in each frame. Accordingly, protection information indicating whether data (content) should be protected on the bus 113 is generated for the data (content) to be recorded in this user data 201 (2 K bytes). This protection information is stored in the least significant bit of the first byte UC(0, S) of the user control data 202 (18 bytes) corresponding to the user data 201.

For example, if the content to be recorded is content that should be protected on the bus 113, "0" is generated and recorded in the least significant bit of the first byte (0, S) of the user control data 202 (18 bytes) as the protection information. If the content to be recorded is content that does not have to be protected on the bus 113, "1" is generated and recorded in the least significant bit of the first byte UC(0, S) of the user control data 202 (18 bytes) as the protection information. In a known data format, "0" is stored in the least significant bit of the first byte UC(0, S) of the user control data 202 (18 bytes) (i.e., the least significant bit is unused). Accordingly, for content recorded in a known data format, information concerning content to be protected on the bus 113 is also stored, and thus, the data format used in this embodiment is compatible with the known data format.

The protection information concerning content that should be protected may be set as "1", and the protection information concerning content that does not have to be protected may be set as "0". In this case, however, all items of known content should be content that does not have to be protected on the bus 113, and thus, they cannot be protected. Accordingly, it is preferable that the protection information concerning content that should be protected is set as "0", and the protection information concerning content that does not have to be protected is set as "1".

The physical address 204 is arranged as 16×9 bytes. This physical address 204 indicates the physical distance on the disc 141.

From the 32×18-byte user control data 202, 24-column× 30-row access block 210 is formed based on the physical address 204. 32-row parity is added to the access block 210 so as to form a BIS (burst instruction sub-code) block 211. The BIS block 211 is formed into a 3-column×496-row BIS cluster 212.

The BIS cluster 212 fills the three BIS blocks 213-1 through 213-3 between the LDC blocks 209-1 through 209-4 so as to form the 155-column×496-row ECC cluster 221. From this ECC cluster 221, a physical cluster 222 consisting of 42 sets, each having 45 channel bit data (data) and one channel bit control data (dc contr.), is formed and is recorded on the optical disc 141.

This physical cluster 222 is grouped into 496 recording frames having 1932 channel bits (1288 data bits). In the physical cluster 222, the 20 channel bits of the first data are set as a synchronizing bit group (Frame Sync).

As discussed above, when the content to be recorded is content that should be protected on the bus 113, the recording/playback processor 123 generates (stores) "0" as the protection information, and when the content to be recorded is content that does not have to be protected on the bus 113, the recording/playback processor 123 generates (stores) "1" as the protection information. The generated protection information is recorded in the user control data 202.

To perform error correction for playing back the content of this data format recorded on the optical disc 141, BIS error correction is generally performed, and the result of BIS error correction is used as revocation information for conducting LDC error correction. Accordingly, since BIS error correction has been finished before outputting user data after LDC error correction, the user control data contained in the BIS has been obtained. Thus, the output of the user data can be controlled by using the user control data.

When playing back the content recorded on the optical disc 141 by the recording/playback processor 123, the protection information recorded on the optical disc 141 is played back before the content. Thus, based on the played back protection information, the input/output controller 122 controls the output of the content to the bus 113.

For example, the input/output controller 122 controls the output of the content to the bus 113 by the mutual authentication unit 121 based on whether the mutual authentication unit 121 has conducted mutual authentication with the AV board 112 and whether the played back content is content to be protected on the bus 113 (whether the protection information is "0"). Based on the control of the input/output controller 122, the mutual authentication unit 121 encrypts the played back content with the common key shared with the drive 111, and outputs the content to the AV board 112 via the bus 113.

Upon receiving the encrypted content from the mutual authentication unit 121, the mutual authentication unit 131 of the AV board 112 decrypts the content and supplies it to the content protector 132.

The content protector 132 further decrypts the content, which has been decrypted with the common key shared with the AV board 112 by the mutual authentication unit 131, by using the block key generated from the disc ID and the disc key of the optical disc 141, and supplies the decrypted content to the AV content processor 133. The AV content processor 133 decodes the decrypted content according to, for example, an MPEG (Moving Picture Experts Group) and plays back the content. The output unit 135 outputs the played back content.

As described above, since the AV board 112 conducts mutual authentication with the drive 111, content to be protected by a copyright or content that does not have to be protected can be sent and received between the AV board 112 and the drive 111.

Even if, for example, content that should be protected is sent to the drive 111 from the HDD 114, mutual authentication is not conducted for the HDD 114 by the drive 111. If the content does not have to be protected, it is processed in the drive 111. That is, in this recording/playback apparatus 101, only copy free data without the need for mutual authentication can be recorded.

As described above, in this recording/playback apparatus 101, the encryption of content or the output of content to a general-purpose bus is flexibly controlled according to whether content should be protected by a copyright.

Figure 9:
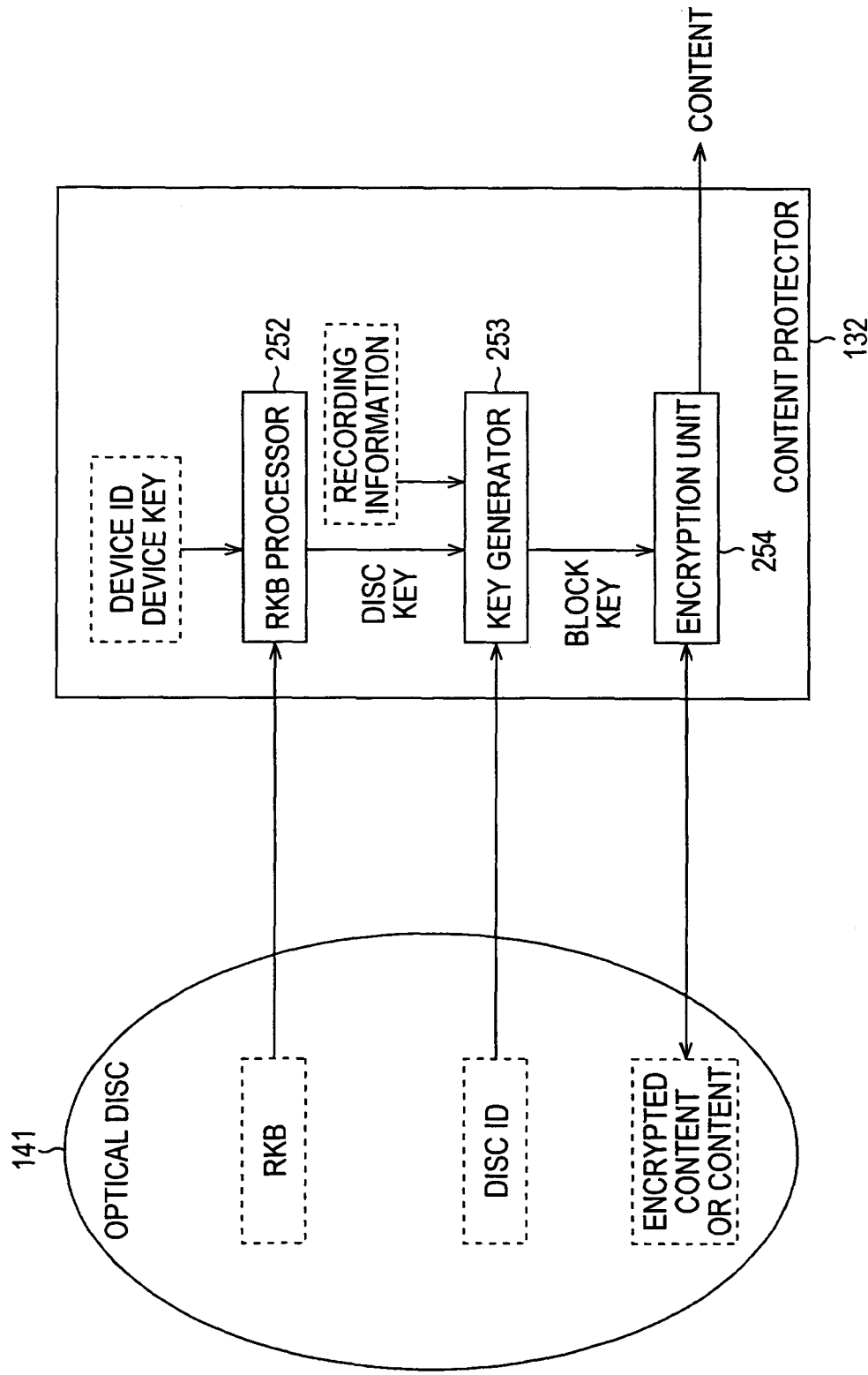
FIG. 9 is a block diagram illustrating an example of the configuration of a content protector 132 shown in FIG. 4.

FIG. 9 illustrates an example of the configuration of the content protector 132. In FIG. 9, only the content protector 132 and the optical disc 141 are shown for the sake of convenience. In actuality, however, as shown in FIG. 4, the mutual authentication unit 131, the bus 113, the mutual authentication unit 121, and the recording/playback processor 123 perform the corresponding processing between the content protector 132 and the optical disc 141.

In the example in FIG. 9, the content protector 132 is formed of an RKB processor 252, a key generator 253, and an encryption unit 254.

The RKB processor 252 obtains a disc key by using the RKB supplied from the optical disc 141, and the device ID and the device key stored in the content protector 132 based on whether the content received from the AV content processor 133 is content that should be protected (the processing for obtaining the disc key is disclosed in Japanese Unexamined Patent Application Publication No. 2002-84271 and is described in detail below with reference to FIGS. 10 through 12).

The key generator 253 generates a block key by using the disc key obtained by the RKB processor 252, the disc ID supplied from the optical disc 141, and recording information stored in the content protector 132 (for example, information used when recording, such as a block seed, a title key, or a recording mode).

If the content supplied from the optical disc 141 is encrypted, the encryption unit 254 decrypts the encrypted content by using the block key generated by the key generator 253, and outputs the content to the AV content processor 133. If the content supplied from the optical disc 141 is not encrypted, the encryption unit 254 directly outputs the content to the AV content processor 133.

If the content supplied from the AV content processor 133 is found to be the content to be protected based on information indicating whether the content received from the AV content processor 133 is content to be protected, the encryption unit 254 encrypts the content by using the block key generated by the key generator 253 in order to protect the content on the optical disc 141, and outputs the content to the optical disc 141. If the content supplied from the AV content processor 133 is content that does not have to be protected, the encryption unit 254 directly (without encrypting the content) supplies the content to the optical disc 141.

Details of the RKB used for the disc-key obtaining processing are given below. FIG. 10 illustrates a structure in which keys are distributed to the recording/playback apparatus 101 of the present invention. Numbers 0 through 15 indicated at the bottommost line of FIG. 10 correspond to the individual recording/playback apparatuses (devices). That is, leaves in the tree structure shown in FIG. 10 correspond to the recording/playback apparatuses.

Device 0 through device 15 each store, in the initial tree which was set when the devices were manufactured (shipped), the keys (node keys) assigned to the nodes from the device leaf to the root (topmost level) and the leaf key of the corresponding leaf. K0000 through K1111 indicated at the bottommost level in FIG. 10 are leaf keys assigned to device 0 through device 15, respectively, and keys KR through K111 from KR positioned at the topmost level to the nodes positioned at the second level from the bottommost level are node keys.

Figure 10:
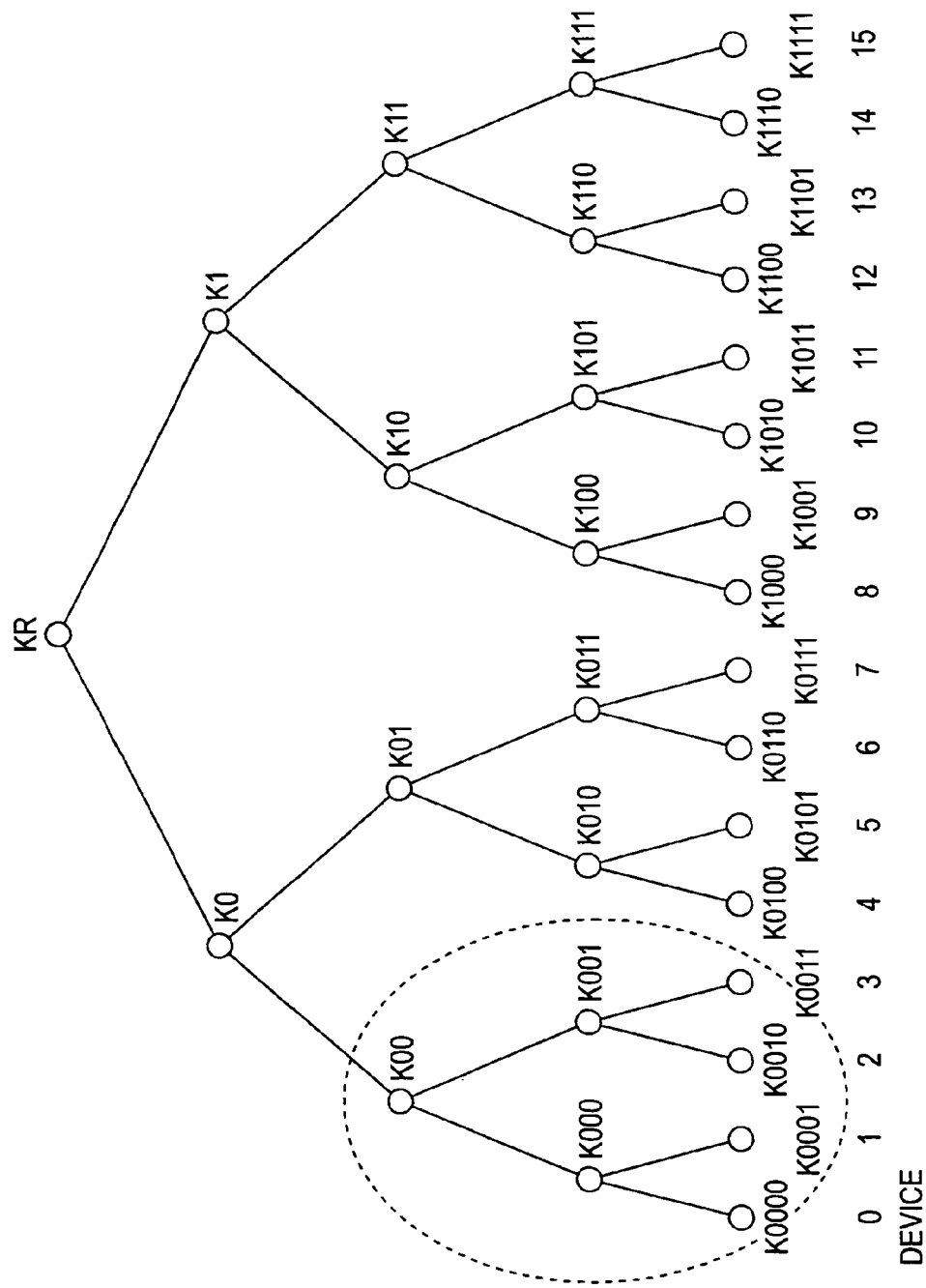
FIG. 10 is a tree structure illustrating the disc key used in the present invention.

In the example in FIG. 10, for example, device 0 owns leaf key K0000, and node keys K000, K00, K0, and KR. Device 5 owns K0101, K010, K01, K0, and KR. Device 15 owns K1111, K111, K11, K1, and KR. In the tree shown in FIG. 10, only 16 devices are shown, and the tree structure, which consists of four levels, is vertically symmetrical with each other. However, more devices may be formed in the tree, or the number of levels may be different at each portion of the tree.

The recording/playback apparatuses contained in the tree structure shown in FIG. 10 use various recording media, for example, DVD, CD, MD (trademark), Memory Stick®. It is also assumed that various application services coexist in the tree structure. The key distribution structure shown in FIG. 10 is applied to a system in which different devices and different applications coexist.

In a system in which various devices and applications coexist, for example, the portion surrounded by the broken line in FIG. 10, i.e., devices 0, 1, 2, and 3 are set as one group using the same recording medium. In this tree structure, the four devices 0, 1, 2, and 3 contained in the same group own common keys K00, K0, and KR as node keys. By utilizing this configuration in which the same node keys are shared, for example, a common master key can be provided only to the devices 0, 1, 2, and 3.

If, for example, the node key K00 itself shared by the devices 0, 1, 2, and 3 is set as the master key, the master key, which is common only for the devices 0, 1, 2, and 3, can be set without sending a new key. Alternatively, a value Enc(K00, Kmaster) generated by encrypting a new master key Kmaster with the node key K00 is distributed to the devices 0, 1, 2, and 3 via a network or by storing the value in the recording medium, and then, only the devices 0, 1, 2, and 3 can obtain the master key Kmaster by decrypting the encryption Enc (K00, Kmaster) with the common node key K00 shared by the devices. Enc(Ka, Kb) indicates that Kb is encrypted with Ka.

If, at a certain time t, the keys K0011, K001, K00, K0, and KR owned by device 3 are decrypted and disclosed by an attacker (hacker), it is necessary to disconnect device 3 for protecting data to be sent and received in the system (the group of devices 0, 1, 2, and 3). Accordingly, the node keys K001, K00, K0, and KR are changed to new keys: K(t)001, K(t)00, K(t)0, K(t)R, respectively, and these renewal keys should be reported to devices 0, 1, and 2. K(t)aaa indicates that this is a renewal key of the key Kaaa at a generation t.

Distribution processing for renewal keys is as follows. Keys are renewed by supplying a table consisting of block data, which is referred to as "RKB (Renewal Key Block)", such as that shown in FIG. 11A, to devices 0, 1, and 2 via a network or by storing the table in a recording medium.

The RKB shown in FIG. 11A is formed as block data having a data configuration that enables only the corresponding devices to renew the node keys. FIG. 11A illustrates an example of block data for distributing the renewal node keys at a generation t to devices 0, 1, and 2 in the tree structure shown in FIG. 10. As described above, device 0 and device 1 need K(t)00, K(t)0, and K(t)R as the renewal node keys, and device 2 needs K(t)001, K(t)00, K(t)0, and K(t)R as the renewal node keys.

The RKB contains a plurality of encrypted keys, such as those in the RKB shown in FIG. 11A. The encrypted key in the bottommost line is Enc(K0010, K(t)001), which is the renewal node key K(t)001 encrypted with the leaf key K0010 owned by device 2. Device 2 decrypts this encrypted key with the leaf key owned by device 2 so as to obtain K(t)001. By using decrypted K(t)001, the encrypted key Enc(K(t)001, K(t)00) in the second line from the bottom in FIG. 11A can be decrypted so as to obtain the renewal node key K(t)00. Thereafter, the encrypted key Enc(K(t)00, K(t)0) in the second line from the top in FIG. 11A is decrypted so as to obtain the renewal node key K(t)0, and then, the encrypted key Enc(K(t)0, K(t)R) in the topmost line in FIG. 11A is decrypted to obtain K(t)R.

The node key K000 is not a key which should be renewed. The renewal node keys required by devices 0 and 1 are K(t)00, K(t)0, and K(t)R. Thus, device 0 and device 1 decrypt the encrypted key Enc(K000, K(t)00) in the third line from the top in FIG. 11A so as to obtain K(t)00. Then, device 0 and device 1 decrypt the encrypted key Enc(K(t)00, K(t)0) in the second line from the top in FIG. 11A so as to obtain the renewal node key K(t)0, and further decrypt the encrypted key Enc(K(t)0, K(t)R) in the topmost line in FIG. 11A so as to obtain K(t)R. In this manner, devices 0, 1, and 2 can obtain the renewal key K(t)R. The index in FIG. 11A indicates the absolute addresses of the node keys and leaf keys used as decryption keys.

If only the node key K00 is required to be renewed without the need to renew the node keys K0 and KR at the top two levels in the tree structure in FIG. 10, the RKB shown in FIG. 11B can be used for distributing the renewal node keys K(t)00 to devices 0, 1, and 2.

The RKB shown in FIG. 11B can be used, for example, when distributing a new master key shared in a specific group. It is now assumed, for example, that devices 0, 1, 2, and 3 in the group surrounded by the broken line of FIG. 10 use a recording medium and require a new common master key K(t)master. In this case, data Enc(K(t), K(t)master) generated by encrypting the new common renewal master key K(t)master with K(t)00 renewed from the node key K00 shared between devices 0, 1, 2, and 3 is distributed together with the RKB shown in FIG. 11B. Accordingly, the data is not decrypted in the devices of another group, for example, device 4.

Devices 0, 1, 2, and 3 can decrypt the above-described ciphertext by using K(t)00 obtained by processing the RKB so as to obtain the master key K(t)master at a generation t.

In the above-described example, the master key is transmitted to each recording/playback apparatus by using the RKB, and the recording/playback apparatus records and plays back data by using the master key. In the present invention, however, the disc key restricted for recording media is used as the above-described master key. This disc key is generated, as shown in FIG. 12, by using the RKB (Renewal Key Block) of the recording medium. The disc key K(t)media is a master key restricted only for recording media, and the basic configuration is similar to that of the master key, and thus, an explanation thereof is omitted.

Figure 12:
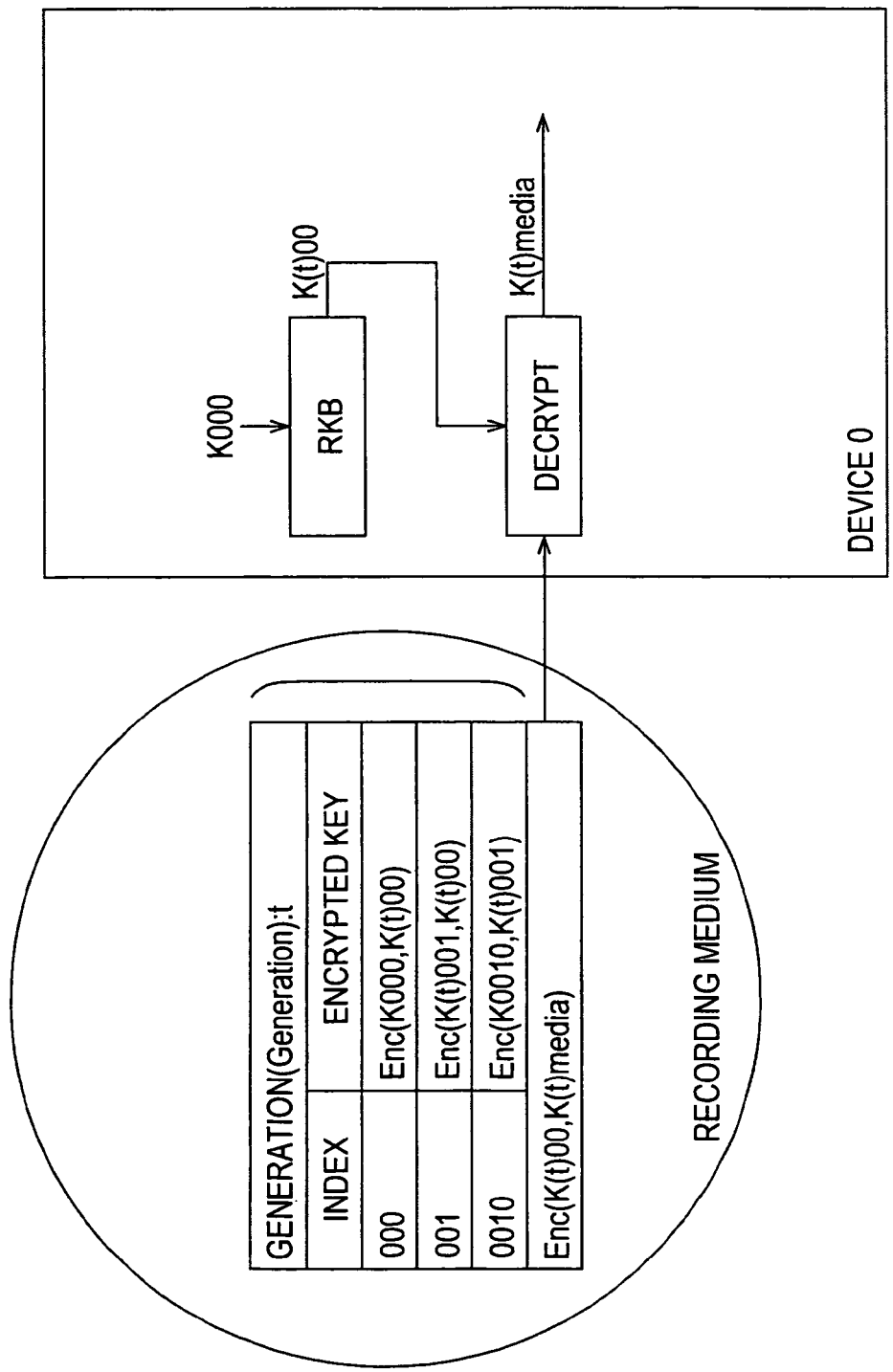
FIG. 12 illustrates an example of applications of the RKBs shown in FIGS. 11A and 11B.

In the example shown in FIG. 12, device 0 generates the renewal node key K(t)00 by using the RKB at a generation t stored in the recording medium, the leaf key K0000 stored in device 0, and the node keys K000 and K00 so as to obtain the renewal disc key K(t)media. The obtained K(t)media is used for recording and playing back data on and from the recording medium.

The pre-recording generation number (Generation #n) in FIG. 12 is not essential and is set as an option since the concept of generations used in the master key does not exist in the disc key.

As described above, the disc key is obtained based on the RKB from the optical disc 141, the device ID (for example, device 0 in FIG. 10) from the content protector 132, the device key (for example, leaf key K0000 of device 0 in FIG. 10), and node keys (for example, K000, K00, and so on, in device 0 in FIG. 10). This disc-key obtaining processing may be performed when the optical disc 141 is loaded in the drive 111 of the recording/playback apparatus 101 for recording or playing back content. Alternatively, the disc-key obtaining processing may be performed when an instruction to record or play back content is given after the optical disc 141 is installed.

Figure 13:
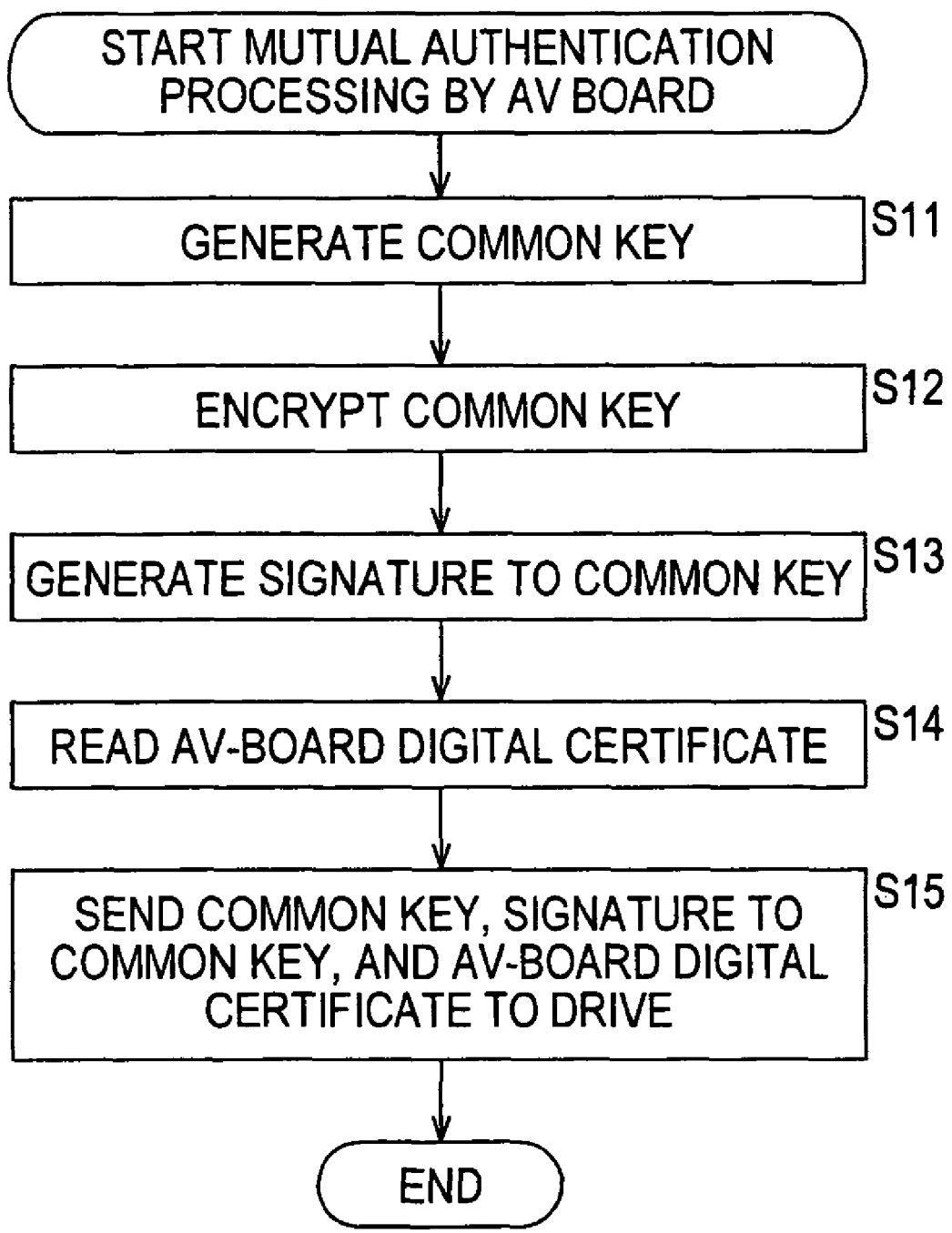
FIG. 13 is a flowchart illustrating mutual authentication processing by an AV board shown in FIG. 4.

A description is now given of mutual authentication processing performed by the AV board 112 of the recording/playback apparatus 101 with reference to the flowchart of FIG. 13.

When the drive 111 and the AV board 112 are connected to turn on the power of the two elements, in step S11, the mutual authentication unit 131 of the AV board 112 generates a common key based on random numbers in a built-in random number generator. In step S12, the mutual authentication unit 131 encrypts the generated common key with the public key of the drive 111. In step S13, the mutual authentication unit 131 generates a signature to the common key encrypted with the private key of the AV board 112. In step S14, the mutual authentication unit 131 reads an AV-board digital certificate which has been obtained from a certificate authority (not shown) and stored in a built-in memory. In step S15, the mutual authentication unit 131 sends the encrypted common key, the signature added to the common key by the AV board 112, and the AV-board digital certificate to the drive 111 via the bus 113.

Figure 14:
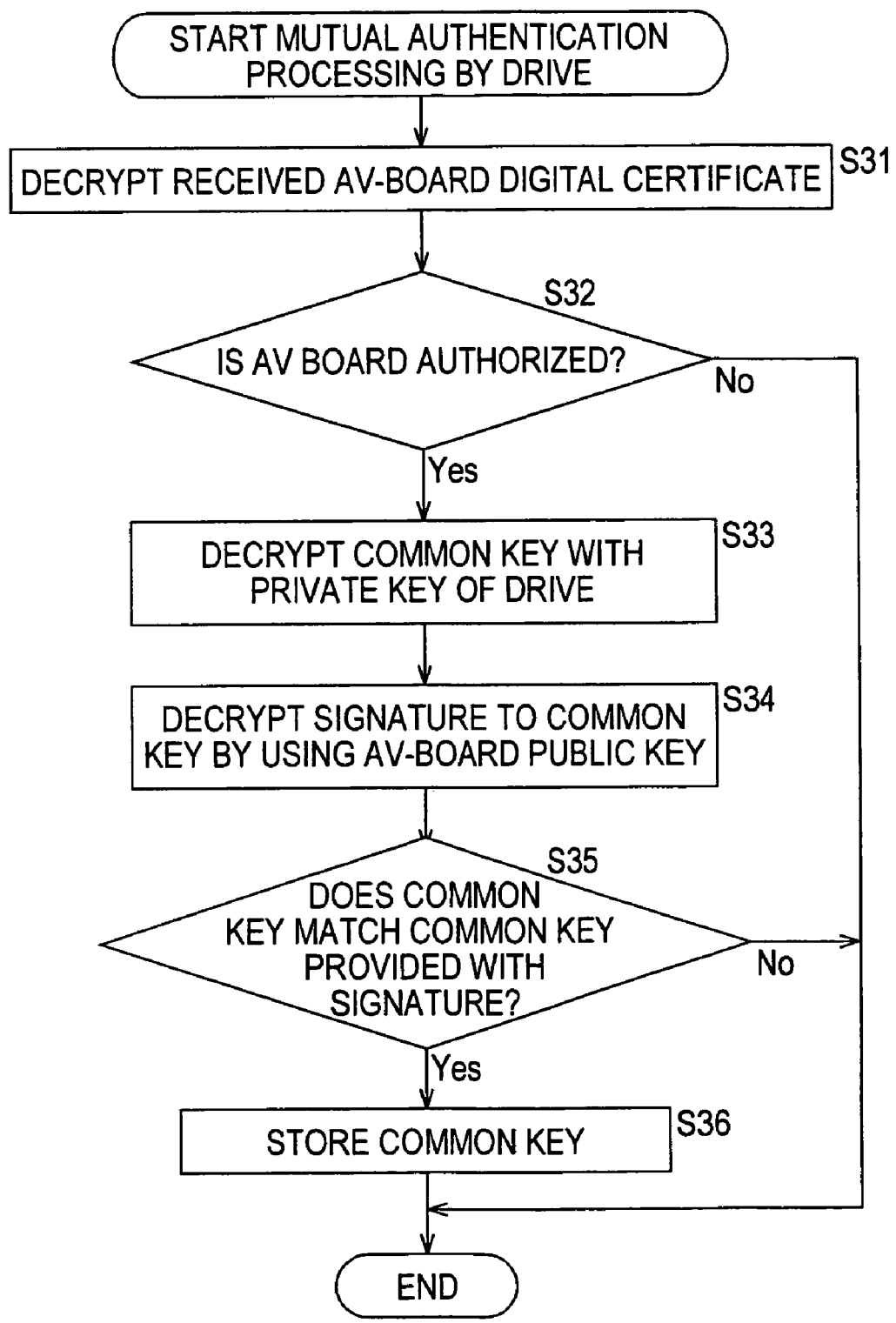
FIG. 14 is a flowchart illustrating mutual authentication processing by a drive shown in FIG. 4.

In this manner, the encrypted common key, the signature to the common key by the AV board 112, and the AV-board digital certificate are sent to the drive 111 from the AV board 112. Mutual authentication processing performed by the drive 111 corresponding to the mutual authentication processing by the AV board 112 is described below with reference to the flowchart of FIG. 14.

In step S31, the mutual authentication unit 121 of the drive 111 decrypts the received AV-board digital certificate based on the public key of the certificate authority, which has been obtained or is obtained when necessary. In step S32, the mutual authentication unit 121 determines whether the AV board 112 is an authorized AV board based on the AV-board digital certificate decrypted in step S31. If the AV-board digital certificate cannot be decrypted or is tampered with, it is determined in step S32 that the AV board 12 is not an authorized AV board, and the processing is terminated.

If it is determined in step S32 that the AV board 112 is an authorized AV board, the AV-board digital certificate is decrypted to obtain the public key of the AV board 112. In step S33, the mutual authentication unit 121 decrypts the encrypted common key with the private key of the drive 111. In step S34, the mutual authentication unit 121 decrypts the signature to the common key added by the AV board 112 by using the public key of the AV board 112.

In step S35, the mutual authentication unit 121 compares the common key decrypted in step S33 with the plaintext common key provided with the signature, and determines whether the two common keys coincide with each other. Accordingly, the mutual authentication unit 121 determines whether the common key is an authorized common key. If it is determined in step S35 that the common key matches the common key provided with the signature, the mutual authentication unit 121 determines that the authorized common key has been received from the AV board 112. Then, in step S36, the mutual authentication unit 121 stores the common key. In contrast, if it is found in step S35 that the common key does not coincide with the common key provided with the signature, the mutual authentication unit 121 determines that the common key has been tampered with between the AV board 112 and the drive 111, and terminates the processing.

Mutual authentication has been conducted between the drive 111 and the AV board 112 as described above, and processing thereafter is executed by sharing the common key between the drive 111 and the AV board 112.

Although an explanation is not given, the mutual authentication unit 121 of the drive 111 may further encrypt the common key obtained from the AV board 112 by using the public key of the drive 111, and send the encrypted common key, a signature to the encrypted common key added by the drive 111, and a drive digital certificate to the AV board 112, and request the AV board 112 to authenticate them.

Figure 15:
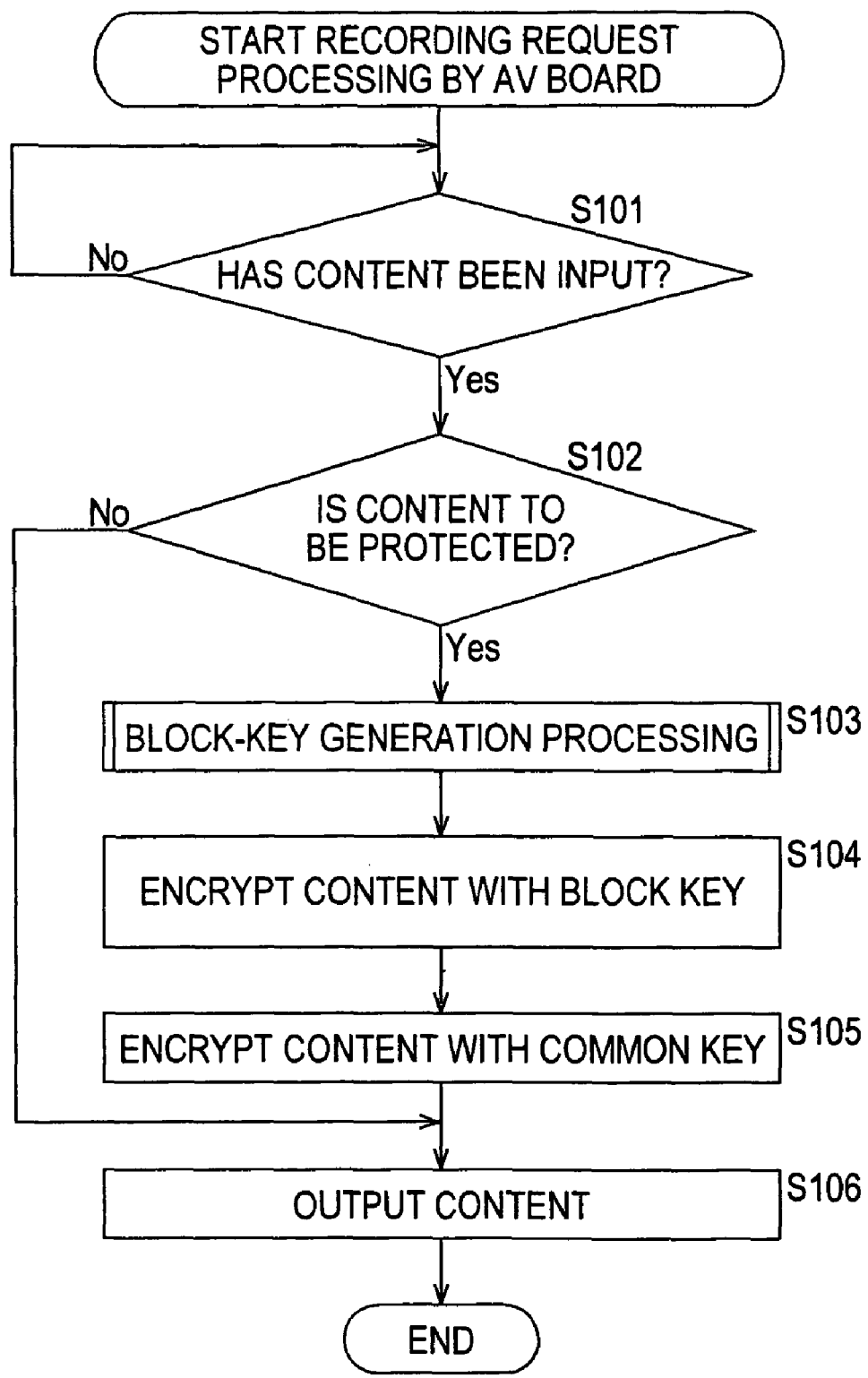
FIG. 15 is a flowchart illustrating recording request processing by the AV board shown in FIG. 4.

Recording request processing performed by the AV board 112 of the recording/playback apparatus 101 is described below with reference to the flowchart of FIG. 15.

In step S101, the AV content processor 133 waits until content is input. Upon receiving a broadcast signal (signal corresponding to content) via the input unit 134, for example, an antenna, the AV content processor 133 determines in step S101 that content has been input. Then, in step S102, the AV content processor 133 determines whether the input content should be protected based on whether or not the input content is encrypted or scrambled.

Figure 16:
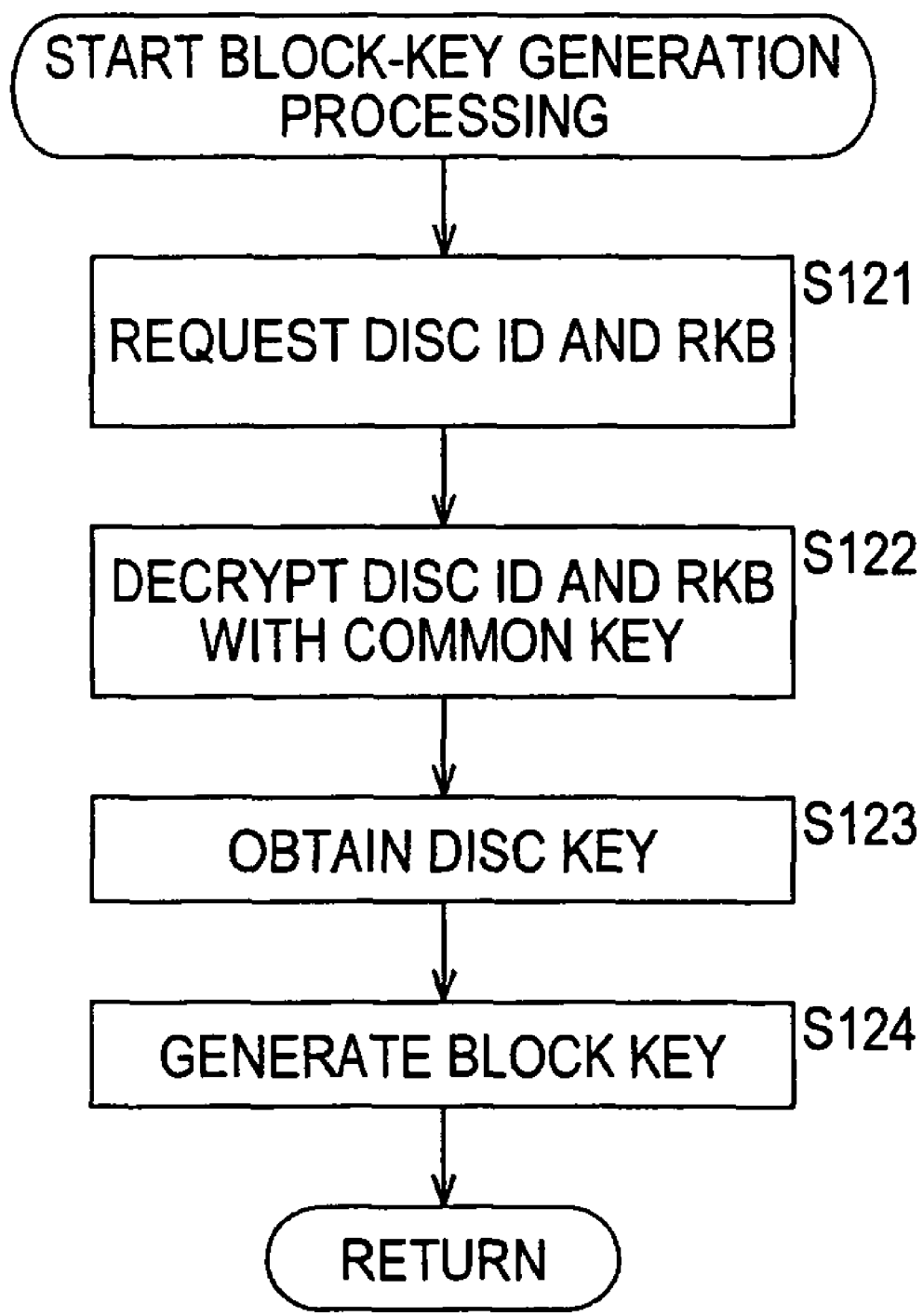
FIG. 16 is a flowchart illustrating block-key generation processing in step S103 of FIG. 15.
Figure 17:
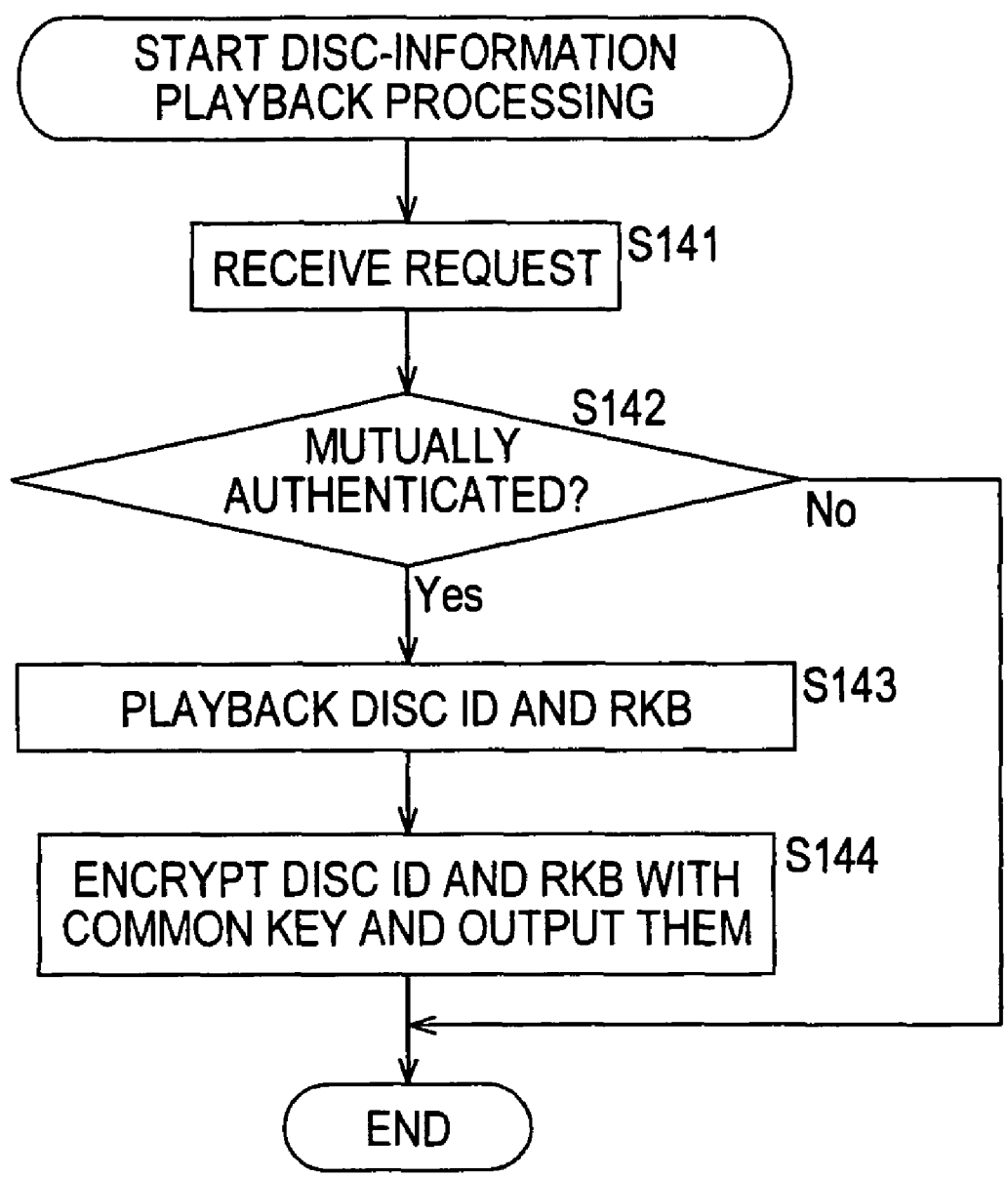
FIG. 17 is a flowchart illustrating disc-information playback processing by the drive shown in FIG. 4 corresponding to the processing of FIG. 16.

If it is determined in step S102 that the content should be protected, the AV content processor 133 decrypts the encrypted or scrambled content by a prestored key (key shared with a device which receives the broadcast signal). In step S103, the AV content processor 133 controls the control protector 132 to generate a block key. The block-key generation processing is described below with reference to the flowchart of FIG. 16. A description is also given, with reference to the flowchart of FIG. 17, of drive information obtaining processing performed by the drive 111 corresponding to the block-key generation processing by the AV board 112 shown in FIG. 16.

In step S121, the RKB processor 252 outputs a request to read disc information (for example, the disc ID and RKB) of the optical disc 141 to the drive 111. More specifically, the RKB processor 252 outputs a request to read the disc ID and RKB of the optical disc 141 to the mutual authentication unit 131. The mutual authentication unit 131 outputs a request to read the disc ID and RKB to the mutual authentication unit 121 of the drive 111 via the bus 113.

In step S141, the mutual authentication unit 121 of the drive 111 receives a request to read the disc ID and RKB of the optical disc 141 from the AV board 112 via the bus 113.

In step S142, the input/output controller 122 determines based on the information from the mutual authentication unit 121 whether the AV board 112, which has sent a request to read the disc ID and RKB, has been mutually authenticated by the drive 111. If it is determined in step S142 that the AV board 112 has not been mutually authenticated by the drive 111, the disc-information playback processing by the drive 111 is terminated. Accordingly, requests from unauthorized devices can be rejected.

As described above, since the AV board 112 has been mutually authenticated by the drive 111, it is determined in step S142 that the AV board 112 has been mutually authenticated by the drive 111. In this case, in step 143, the recording/playback processor 123 plays back the disc ID and RKB recorded on the optical disc 141 and supply them to the mutual authentication unit 121.

In step S144, the mutual authentication unit 121 encrypts the disc ID and RKB supplied from the recording/playback processor 123 by using the common key shared with the AV board 112, and outputs the encrypted disc ID and RKB to the AV board 112 via the bus 113.

In step S122, upon receiving the encrypted disc ID and RKB via the bus 113, the mutual authentication unit 131 of the AV board 112 decrypts the disc ID and RKB with the common key shared with the drive 111, and supplies them to the RKB processor 251.

In step S123, the RKB processor 251 obtains the disc key by using the supplied RKB, and the device ID and device key stored in a built-in memory. More specifically, the RKB processor 251 calculates the key K(t)00 of the node 00 at a time of pre-recording generation information (Generation #n) (for example, at time t in FIG. 12) by using the supplied RKB, the device ID (for example, device 0 in FIG. 10) and the device key (for example, leaf key K0000 of device 0 in FIG. 10) stored in the built-in memory, and the node keys (for example, K000, K00, K0, and KR of device 0 in FIG. 10). The RKB processor 251 then obtains ciphertext Enc(K(t)00, K(t)media), which is generated by encrypting the disc key K(t)media with the key K(t)00, from the supplied RKB, and decrypts this ciphertext so as to obtain the disc key K(t)media.

In step S124, the key generator 253 generates a block key by using the disc ID supplied from the mutual authentication unit 131, the disc key obtained in step S123, and recording information of the content protector 132, and stores the block key in a built-in memory of the encryption unit 254.

The block key is generated as described above, and in step S104 of FIG. 15, the encryption unit 254 encrypts the content supplied from the AV content processor 133 with the block key generated in step S124, and outputs the encrypted content to the mutual authentication unit 131.

In step S105, the mutual authentication unit 131 further encrypts the content, which has been encrypted with the block key in step S104, by using the common key shared with the drive 111. In step S106, the mutual authentication unit 131 then outputs the encrypted content to the drive 111 via the bus 113.

If it is determined in step S102 that the content received from the AV content processor 133 does not have to be protected, it is not necessary that the content be encrypted in the encryption unit 254 (to be protected on the optical disc 141) and be encrypted in the mutual authentication unit 131 (to be protected on the bus 113). Accordingly, steps S103 through S105 are skipped. That is, the encryption unit 254 outputs the content to the mutual authentication unit 131 without encrypting it (as the raw data). In step S106, the mutual authentication unit 131 outputs the unencrypted content to the drive 111 via the bus 113.

Figure 18:
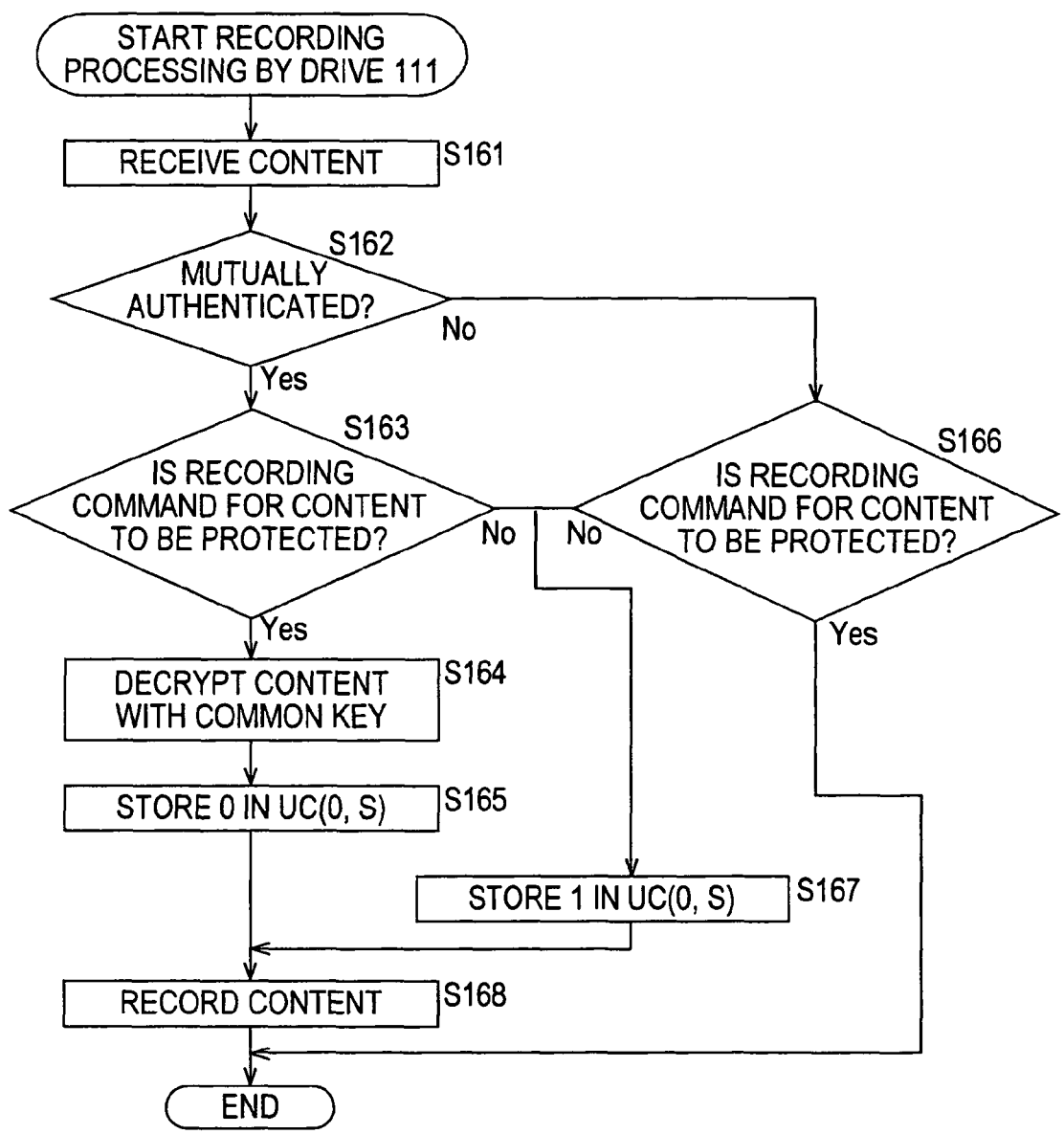
FIG. 18 is a flowchart illustrating recording processing by the drive shown in FIG. 4.

As discussed above, content to be protected is encrypted by using the block key obtained from the RKB and disc ID in the AV board 112. The content to be protected is further encrypted temporarily with the common key shared with the drive 111 and is output to the bus 113. In contrast, content that does not have to be protected is output to the bus 113 as the raw data. The recording processing performed by the drive 111 corresponding to the above-described processing is described below with reference to the flowchart of FIG. 18.

In step S161, the mutual authentication unit 121 of the drive 111 receives the content from the AV board 112 via the bus 113.

In step S162, the input/output controller 122 determines based on information supplied from the mutual authentication unit 121 whether the device which has sent the content has been mutually authenticated by the drive 111. If it is determined in step S162 that the AV board 112 has been mutually authenticated by the drive 111, the process proceeds to step S163. In step S163, the input/output controller 122 determines whether the recording command of the input content is for content that should be protected on the bus 113 based on whether the content input into the mutual authentication unit 121 has been encrypted with the common key.

If it is determined in step S163 that the recording command of this content is for content that should be protected on the bus 113, in step S164, the input/output controller 122 controls the mutual authentication unit 121 to decrypt the received content with the common key shared with the AV board 112. Accordingly, at this stage, this content is encrypted only with the block key obtained from the disc ID and RKB.

In step S165, the input/output controller 122 controls the recording/playback processor 123 to generate protection information "0", which indicates that this content should be protected on the bus 113, and to store the protection information in the user control data UC(0, S) corresponding to this content. In step S168, the input/output controller 122 then records the protection information with the content encrypted with the block key on the optical disc 141.

On the other hand, for example, content stored in the HDD 114 without a mutual authentication unit is input. In this case, in step S161, the mutual authentication unit 121 receives the content from the HDD 114 via the bus 113. Since the HDD 114 is not provided with a mutual authentication unit, it is determined in step S162 that the device which has sent the content has not been mutually authenticated by the drive 111, and the process proceeds to step S166. In step S166, the input/output controller 122 determines whether the recording command of the input content is for content that should be protected on the bus 113 based on whether the content input into the mutual authentication unit 121 has been encrypted with the common key.

If it is determined in step S163 or S166 that the recording command of the input content is for content that does not have to be protected on the bus 113, the process proceeds to step S167. In step S167, the input/output controller 122 controls the recording/playback processor 123 to generate (store) protection information "1", which indicates that this content does not have to be protected on the bus 113, in the user control data UC(0, S) corresponding to this content. In step S168, the input/output controller 122 then records the generated protection information on the optical disc 141 together with the unencrypted content.

If it is determined in step S166 that the recording command of the input content is for content that should be protected on the bus 113, an error occurs, and the recording processing by the drive 111 is forcefully terminated. Accordingly, in the drive 111, content from the unauthenticated HDD 114 is not recorded as the content that should be protected.

As discussed above, content to be protected supplied from the authenticated AV board 112 is recorded on the optical disc 141 together with the protection information "0", which indicates that this content should be protected on the bus 113. In this case, the content to be protected is encrypted with the block key obtained from the disc ID and RKB. In contrast, content which does not have to be protected from the authenticated AV board 112 or content which does not have to be protected from the unauthenticated HDD 114 is stored in the optical disc 141 together with the protection information "1", which indicates that this content does not have to be protected on the bus 113. In this case, content that does not have to be protected has not been encrypted.

Figure 19:
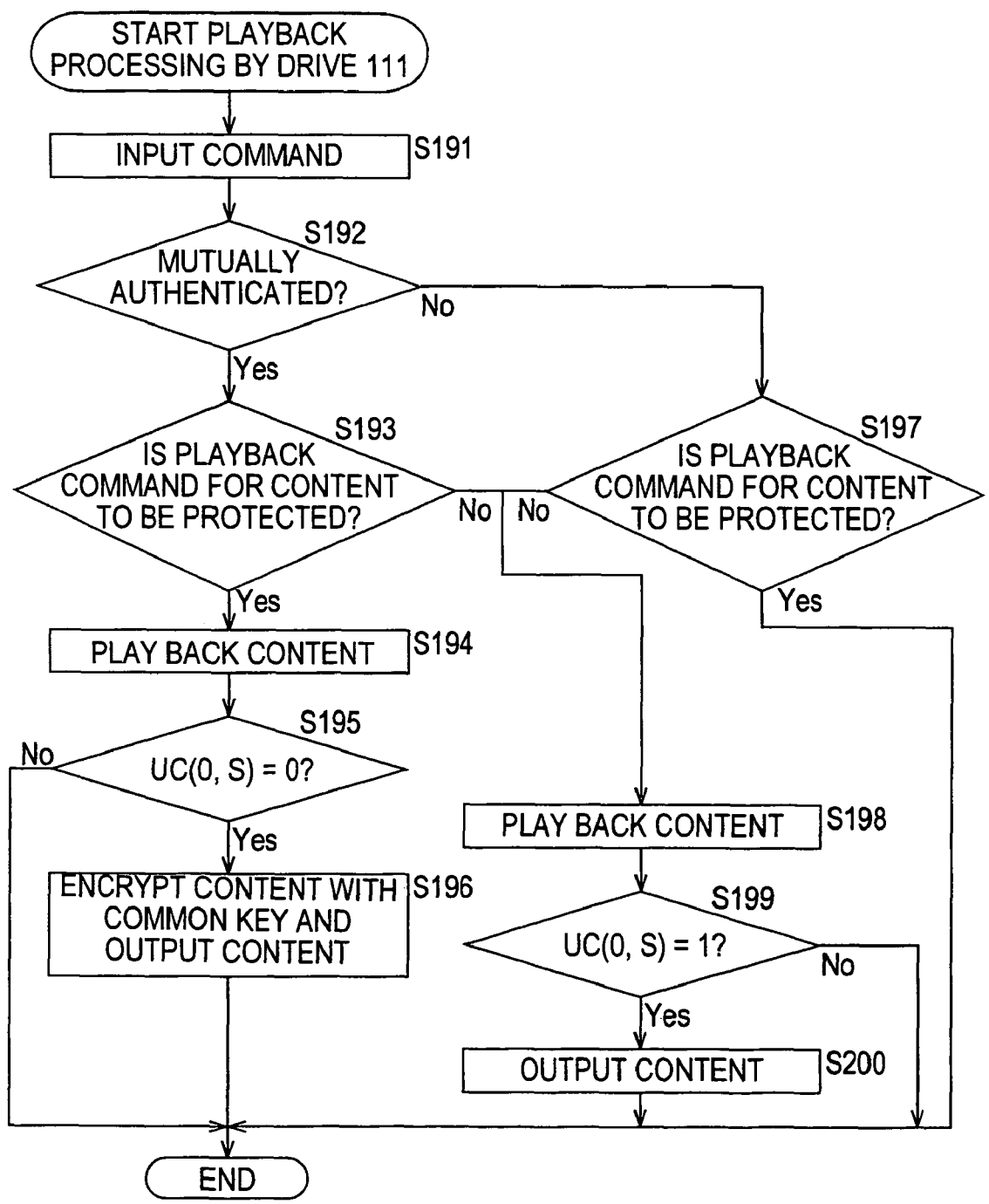
FIG. 19 is a flowchart illustrating playback processing by the drive shown in FIG. 4.

The protection information stored as described above is played back by content playback processing by the drive 111, which is described below, and is used. The content playback processing by the drive 111 is described below with reference to the flowchart of FIG. 19.

To output content recorded on the optical disc 141 which should be protected from the output unit 135 of the AV board 112, the user inputs a content playback command into the AV board 112 via an operation input unit (not shown). The mutual authentication unit 131 of the AV board 112 sends the playback command to the drive 111 via the bus 113. Accordingly, in step S191, the mutual authentication unit 121 receives the playback command from the AV board 112.

In step S192, the input/output controller 122 determines whether the device to output the content (in this case, the AV board 112) has been mutually authenticated by the drive 111 based on the information from the mutual authentication unit 121. If it is determined in step S192 that the AV board 112 has been mutually authenticated, the input/output controller 122 determines in step S193 whether the playback command from the AV board 112 is for content to be protected.

If it is determined in step S193 that the playback command from the AV board 112 is for content to be protected, in step S194, the recording/playback processor 123 plays back the specified content from the optical disc 141.

As described with reference to FIG. 5, when playing back content, the protection information (user control data) recorded on the optical disc 141 is played back before the content. Accordingly, the input/output controller 122 determines in step S195 whether the user control data UC(0, S) corresponding to the content indicates "0". If UC(0, S) corresponding to the content is found to be "0", it means that this content should be protected on the bus 113. Then, in step S196, the input/output controller 122 controls the mutual authentication unit 121 to encrypt the played back content by using the common key shared with the AV board 112, and outputs the encrypted content to the AV board 112 via the bus 113. Accordingly, authorized data can be prevented from being obtained (hacked) on the bus 113.

If it is determined in step S195 that UC(0, S) corresponding to the content is not "0" (UC(0, S) corresponding to the content is "1"), this content does not have to be protected on the bus 113, which is inconsistent with the playback command indicating that content should be protected, supplied from the AV board 112. Thus, the playback processing by the drive 111 is terminated. That is, the drive 111 is controlled not to output the data to the bus 113.

On the other hand, in order to store (record) in the HDD 114 content recorded on the optical disc 141 that does not have to be protected, the user inputs a content playback command into the HDD 114 via an operation input unit (not shown). The HDD 114 sends the playback command to the drive 111 via the bus 113. Accordingly, in step S191, the mutual authentication unit 121 receives the playback command from the HDD 114.

In step S192, the input/output controller 112 determines that the device to output the content (in this case, the HDD 114) has not been mutually authenticated based on the information from the mutual authentication unit 121. In this case, in step S197, the input/output controller 122 determines whether the playback command from the HDD 114 is for content to be protected.

If it is determined in step S193 or S197 that the playback command from the device to output the content is for content that does not have to be protected, in step S198, the recording/playback processor 123 plays back the specified content from the optical disc 141. In step S199, the input/output controller 122 determines whether UC(0, S) of the user control data associated with the content is "1". If UC(0, S) associated with the content is found to be "1", it means that this content does not have to be protected on the bus 113, and the process proceeds to step S200. In step S200, the input/output controller 122 controls the mutual authentication unit 121 to directly output the played back content (as the raw data) to the device (in this case, the AV board 112 or the HDD 114) via the bus 113.

If it is determined in step S197 that the command from the HDD 114 is a playback command for content to be protected, or if it is determined in step S199 that UC(0, S) associated with the content is not "1" (UC(0, S) associated with the content is "0"), an error occurs since content to be protected cannot be output to the unauthenticated HDD 114. Thus, the output processing by the drive 111 is forcefully terminated. That is, in the drive 111, a playback command for the content to be protected supplied from the HDD 114 is rejected. Even if the command is a playback command for content that does not have to be protected, the corresponding content is not output if it is found that the command is for content to be protected on the bus 113.

As discussed above, in response to the playback command from the authenticated AV board 112, the content to be protected on the bus 113 is encrypted with the common key and is output to the AV board 112 via the bus 113. The content that does not have to be protected on the bus 113 is directly output (without being encrypted) to the AV board 112 via the bus 113. Then, the content is received by the mutual authentication unit 131 of the AV board 112 in step S201 of FIG. 20, which is described below.

In response to the playback command from the unauthenticated HDD 114, content to be protected on the bus 113 is not output. In contrast, content that does not have to be protected on the bus 113 is directly output (without being encrypted) to the HDD 114 via the bus 113. This enables the HDD 114 to store content that does not have to be protected. Thus, storage devices can be efficiently utilized.

The content to be protected is encrypted with both the block key obtained from the disc ID and RKB and the common key which is authenticated between devices to send and receive the content (in this case, the drive 111 and the AV board 112). Accordingly, the content can be protected from unauthorized copying via the general-purpose bus 113.

In a known recording/playback apparatus, "0" is stored in the least significant bit of the first byte UC(0, S) of the user control data 202 (18 bytes) corresponding to the content recorded on an optical disc which should be protected. Accordingly, the above-described playback processing for the content to be protected can be executed for content to be protected recorded in a known data format (for authenticated devices, content is encrypted with a common key and is output, and for unauthenticated devices, content is not output). Thus, content can be protected from unauthorized copying on the general-purpose bus 113. That is, the compatibility with known recording/playback apparatuses can be maintained.

Figure 20:
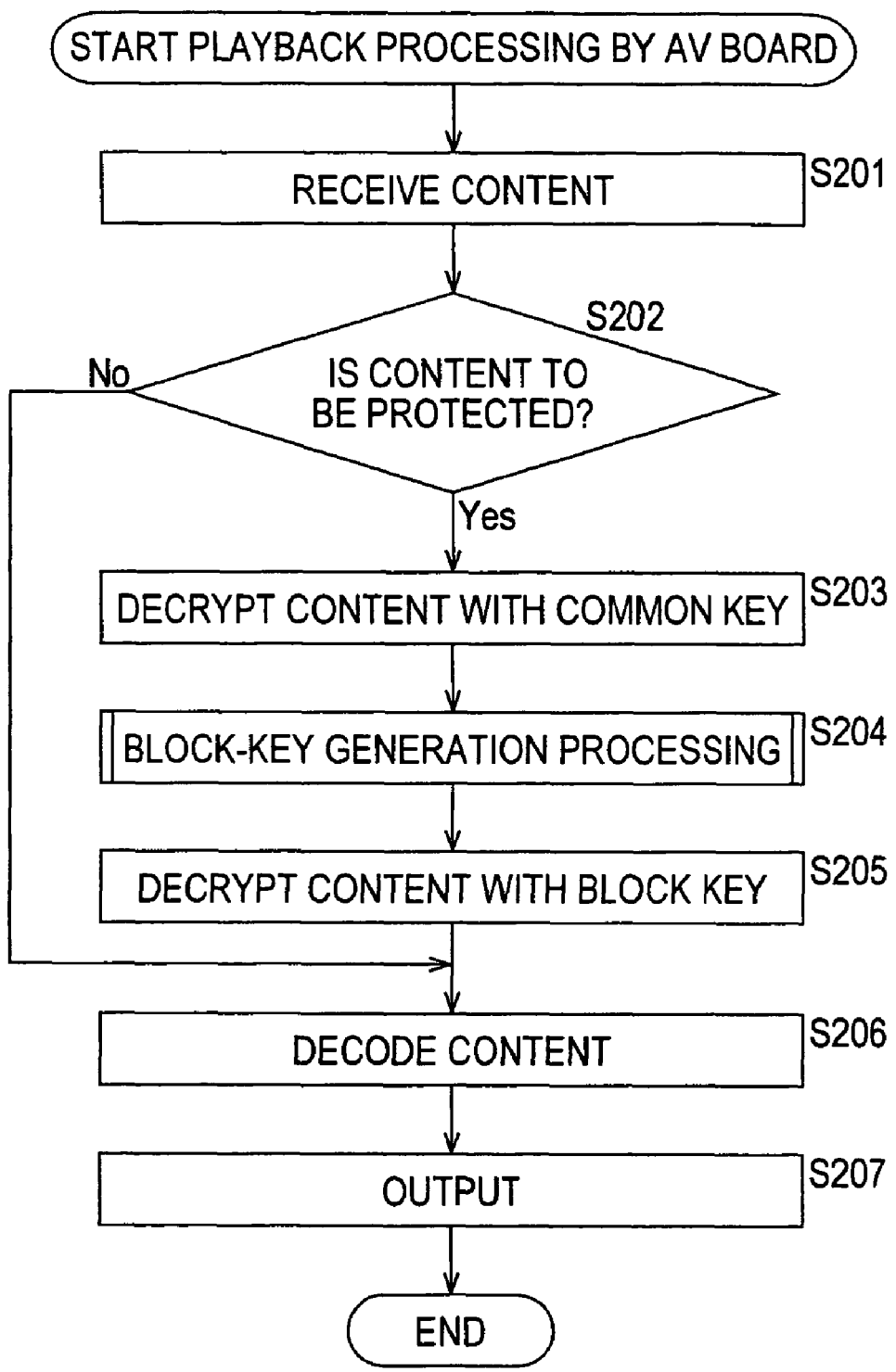
FIG. 20 is a flowchart illustrating playback processing by the AV board shown in FIG. 4.

Playback processing by the AV board 112 associated with the above-described playback processing by the drive 111 is described below with reference to the flowchart of FIG. 20.

The drive 111 receives the playback command for content to be protected from the AV board 112, plays back the content from the optical disc 141, and outputs the content via the bus 113. Thus, in step S201, the mutual authentication unit 131 of the AV board 112 receives the content. In step S202, the mutual authentication unit 131 of the AV board 112 then determines whether the received content is encrypted by the mutual authentication unit 121 of the drive 111 (whether the content is to be protected).

If it is determined in step S202 that the content is encrypted with the common key, i.e., the content should be protected, in step S203, the mutual authentication unit 131 decrypts the received content with the common key shared with the drive 111, and outputs the content to the content protector 132. At this stage, this content is encrypted only with the block key obtained from the disc ID and RKB.

In step S204, the content protector 132 performs block-key generation processing. This block-key generation processing is similar to that discussed with reference to FIG. 16, and thus, an explanation thereof is omitted. Simply, in step S204, the disc key is obtained from the RKB of the optical disc 141 so as to generate the disc key and the disc ID of the optical disc 141. Then, in step S205, the encryption unit 254 decrypts the content supplied from the mutual authentication unit 131 with the block key and supplies the encrypted content to the AV content processor 133.

If it is determined in step S202 that the received content is not encrypted, i.e., the content does not have to be protected, it is not necessary to decrypt this content. Accordingly, since the content passes through the mutual authentication unit 131 and the content protector 132, steps S203 through S205 are skipped.

In step S206, the AV content processor 133 decodes the content supplied from the content protector 132 according to, for example, an MPEG (Moving Picture Experts Group) method, and plays it back. In step S207, the output unit 135 outputs the played back content.

As discussed above, both the content to be protected and the content that does not have to be protected recorded on the optical disc 141 can be output to the AV board 112 which is mutually authenticated with the drive 111.

In the above description, the AV board 112 generates a block key when recording or playing back the content after determining that the received content should be protected. However, this block-key generation processing may be performed by the content protector 132 of the AV board 112 every time the optical disc 141 is loaded.

Figure 21:
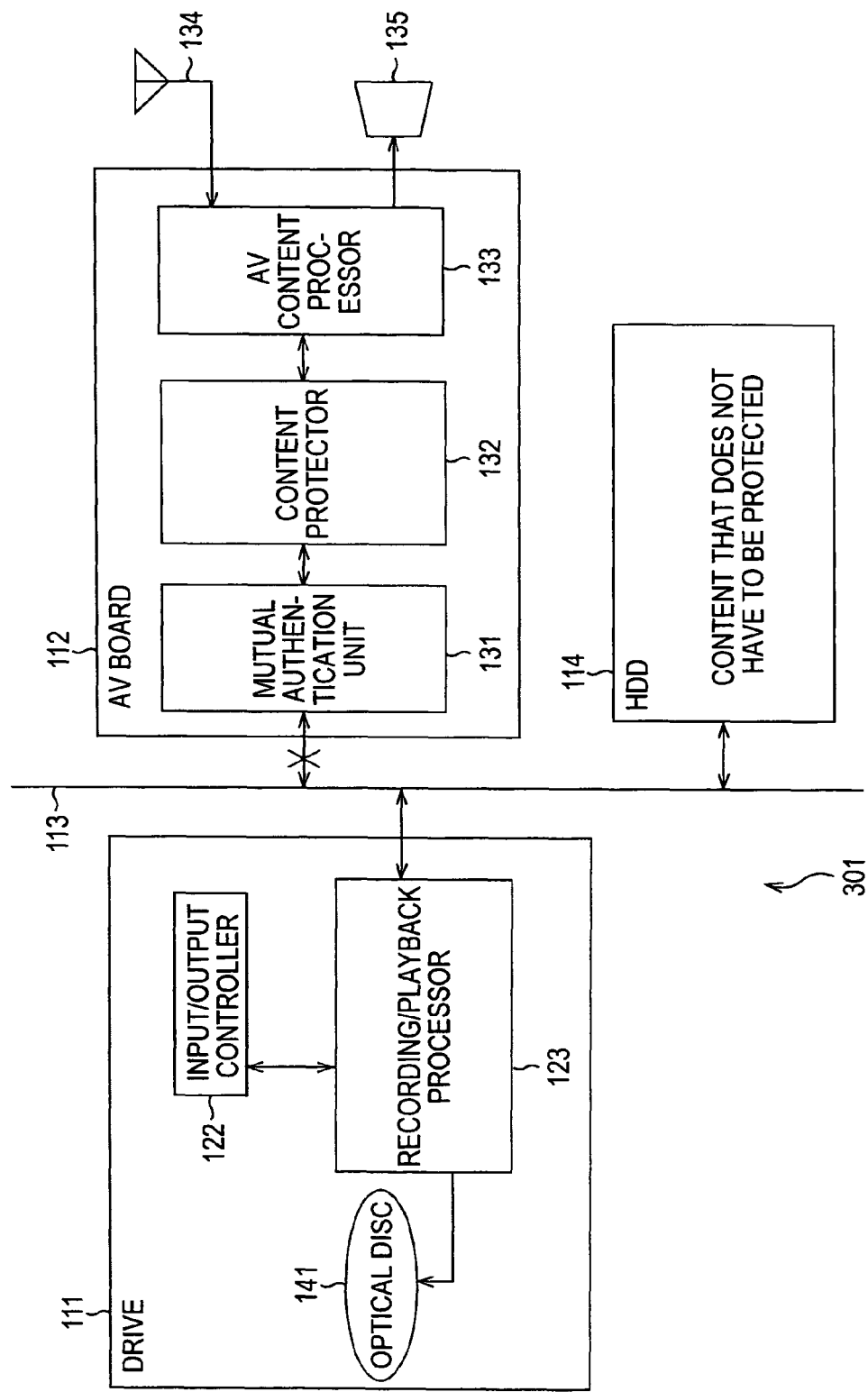
FIG. 21 is a block diagram illustrating another example of the configuration of the recording/playback apparatus shown in FIG. 4.

FIG. 21 illustrates another example of the configuration of the recording/playback apparatus of the present invention. The basic configuration of a recording/playback apparatus 301 shown in FIG. 21 is similar to the recording/playback apparatus 101 shown in FIG. 4. In the recording/playback apparatus 301 shown in FIG. 21, however, the mutual authentication unit 121 of the drive 111 in the recording/playback apparatus 101 shown in FIG. 4 is removed.

Thus, in the recording/playback apparatus 301 shown in FIG. 21, even though the drive 111 is connected to the bus 113, it does not authenticated (a common key is not shared) by the AV board 112 since the drive 111 does not provided with a mutual authentication function. Accordingly, although content-playback-request processing from the AV board 112 is not executed in the drive 111, the drive 111 can send and receive content that does not have to be protected to and from the HDD 114 which is not provided with a mutual authentication function.

Figure 22:
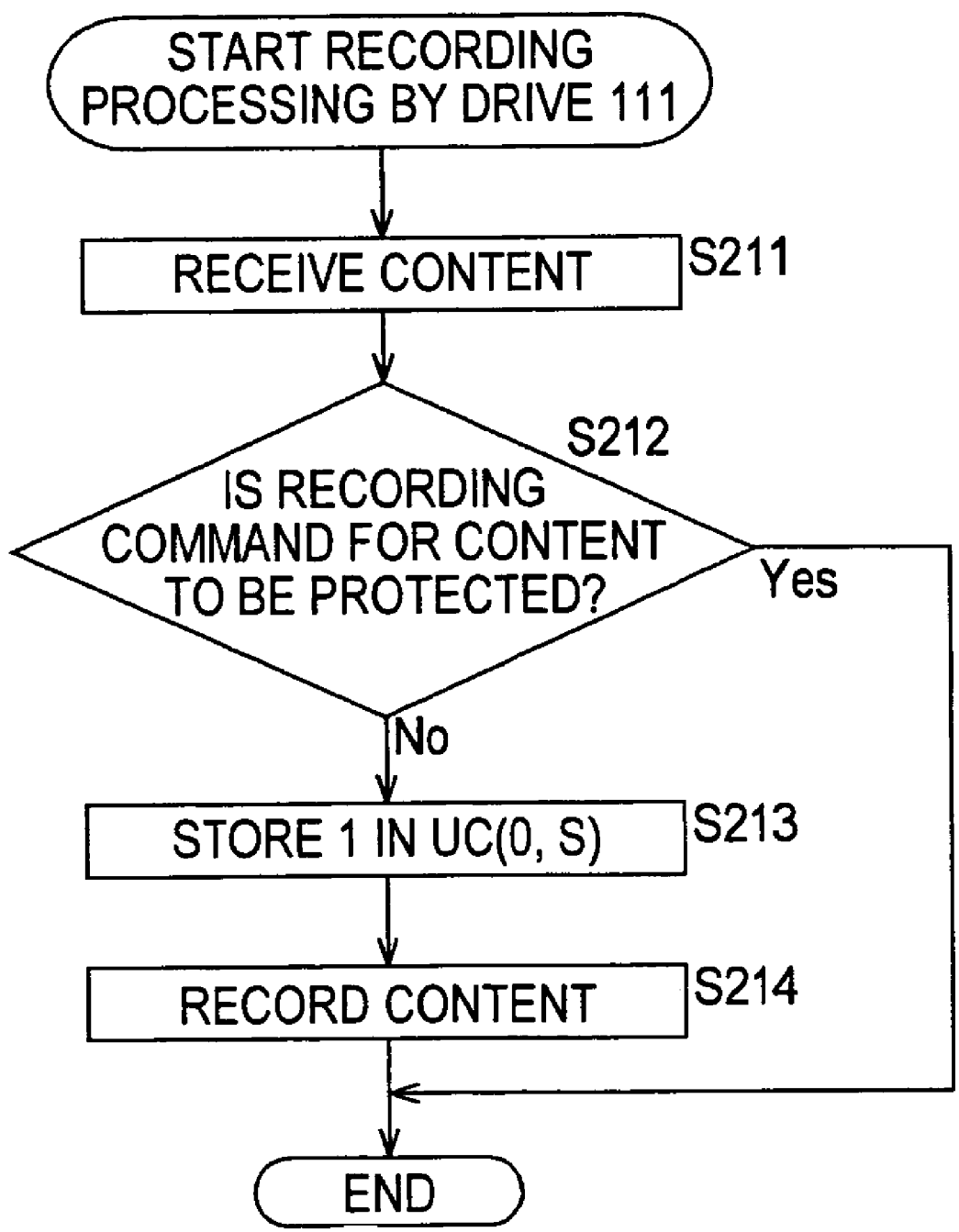
FIG. 22 is a flowchart illustrating recording processing by the drive shown in FIG. 21.

Recording processing by the drive 111 of the recording/playback apparatus 301 is described below with reference to the flowchart of FIG. 22. Steps S211 through S214 of FIG. 22 are similar to step S161 and steps S166 through S168 of FIG. 18, and thus, a detailed explanation thereof is omitted.

In step S211, content that does not have to be protected is received from the HDD 114 by the recording/playback processor 123 via the bus 113. In step S212, the input/output controller 122 determines that the recording command is not for content to be protected on the bus 113 since the content input into the recording/playback processor 123 is not encrypted with a common key. In step S213, the recording/playback processor 123 generates and stores the protection information "1", which indicates that this content does not have to be protected on the bus 113, in the user control data UC(0, S) associated with the content. Then, in step S214, the recording/playback processor 123 records this content from the HDD 114 on the optical disc 141.

If it is determined in step S212 that content encrypted with a common key is input and that the recording command is for content to be protected, an error occurs, and the recording processing by the drive 111 is forcefully terminated.

In this manner, content from the HDD 114 without a mutual authentication function can be recorded on the optical disc 141 together with protection information indicating that this content does not have to be protected on the bus 113.

Figure 23:
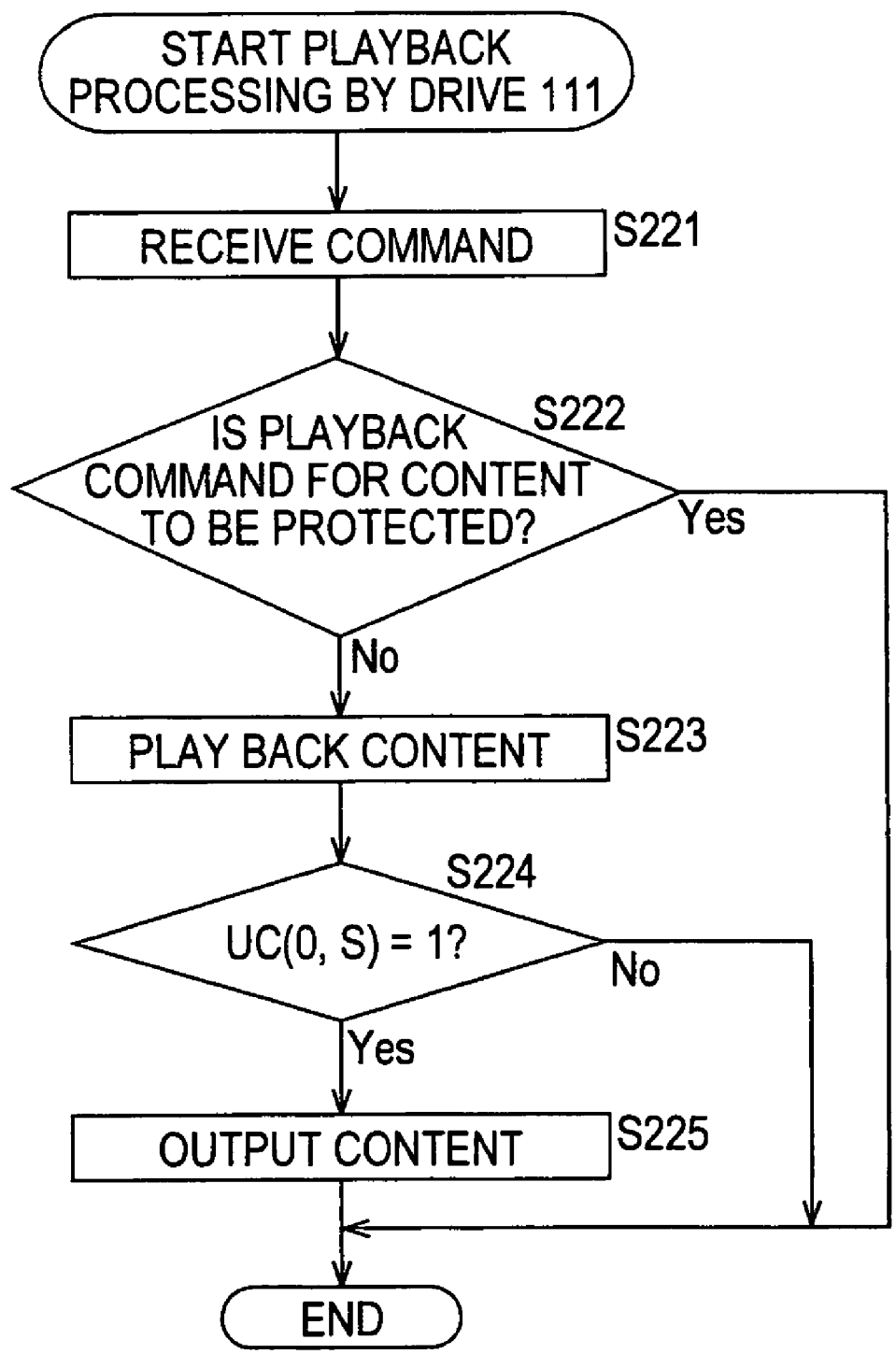
FIG. 23 is a flowchart illustrating playback processing by the drive shown in FIG. 21.

Playback processing by the drive 111 of this recording/playback apparatus 301 is described below with reference to the flowchart of FIG. 23. Steps S221 through S225 of FIG. 23 are similar to step S191 and steps S197 through S200 of FIG. 19, and a detailed explanation thereof is thus omitted.

For example, in order to store (record) in the HDD 114 content recorded on the optical disc 141 that does not have to be protected, the user inputs a content playback command into the HDD 114 via the input unit. The HDD 114 sends the playback command to the drive 111 via the bus 113. In step S221, the playback command from the HDD 114 is received. If the input/output controller 122 determines in step S222 that the playback command from the HDD 114 is a command for content that does not have to be protected, in step S223, the recording/playback processor 123 plays back the specified content from the optical disc 141.

If the input/output controller 122 determines in step S224 that UC(0, S) of the user control data corresponding to the content is "1", the content is found to be content that does not have to be protected on the bus 113. Then, in step S225, the content played back by the recording/playback processor 123 is directly (as the raw data) output to the HDD 114 via the bus 113.

If it is determined in step S222 that the command from the HDD 114 is a playback command for content to be protected, or if it is determined in step S224 that UC(0, S) associated with the content is not "1", an error occurs since content to be protected on the bus 113 cannot be output to the unauthenticated HDD 114. Then, the recording processing by the drive 111 is forcefully terminated.

As discussed above, when the protection information "1" is played back in response to the playback command from the HDD 114, the played back content that does not have to be protected on the bus 113 is directly output (without being encrypted) to the HDD 114 via the bus 113. Accordingly, since the content that does not have to be protected is not encrypted with a common key, it can be supplied to and stored in the HDD 14. Thus, the storage capacity of the HDD 14 can be efficiently utilized.

Figure 24:
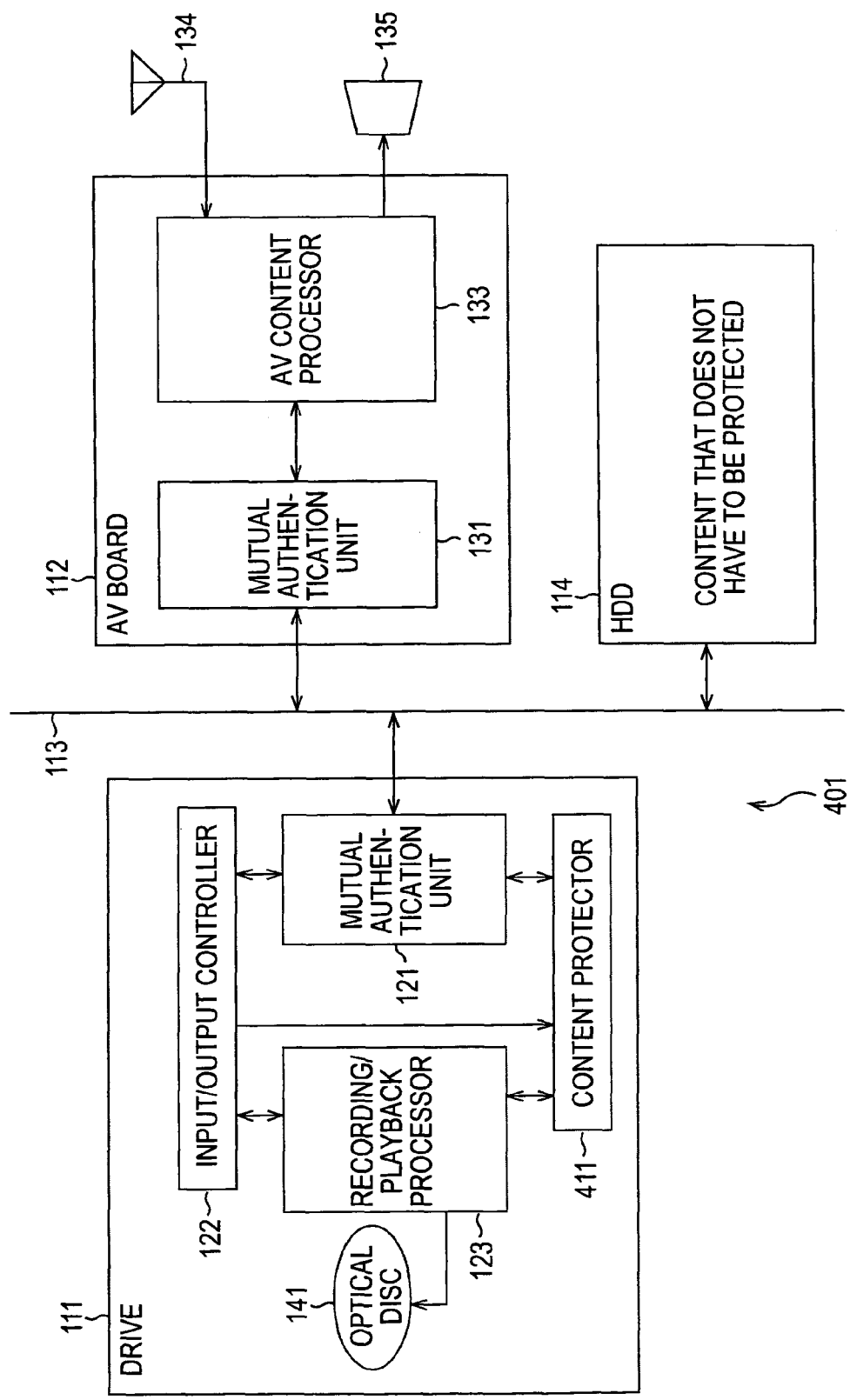
FIG. 24 is a block diagram illustrating still another example of the configuration of the recording/playback apparatus of the present invention.

FIG. 24 illustrates a still another example of the configuration of the recording/playback apparatus to which the present invention is applied.

The basic configuration of a recording/playback apparatus 401 shown in FIG. 24 is similar to the recording/playback apparatus 101 shown in FIG. 4. However, the content protector 132 of the AV board 112 shown in FIG. 4 is removed from the AV board 112 shown in FIG. 24, and instead, a content protector 411 is disposed in the drive 111.

Accordingly, in the AV board 112 shown in FIG. 24, content supplied from the AV content processor 133 is output to the mutual authentication unit 131, and content output from the mutual authentication unit 131 is supplied to the AV content processor 133.

In the drive 111 shown in FIG. 24, content input into the mutual authentication unit 121 is supplied to the content protector 411. The basic configuration of the content protector 411 is similar to that of the content protector 132 shown in FIG. 4. Accordingly, under the control of the input/output controller 122, the content protector 411 encrypts the content supplied from the mutual authentication unit 121 with the block key obtained from the disc ID and RKB of the optical disc 141 or the block key obtained only from the RKB (disc key), and outputs the encrypted content to the recording/playback processor 123.

The recording/playback processor 123 supplies the content played back from the optical disc 141 to the content protector 411. The content protector 411 decrypts, under the control of the input/output controller 122, the content with the block key obtained form the disc ID and RKB of the optical disc 141 or the block key obtained only from the RKB, and outputs the decrypted content to the mutual authentication unit 121.

Figure 25:
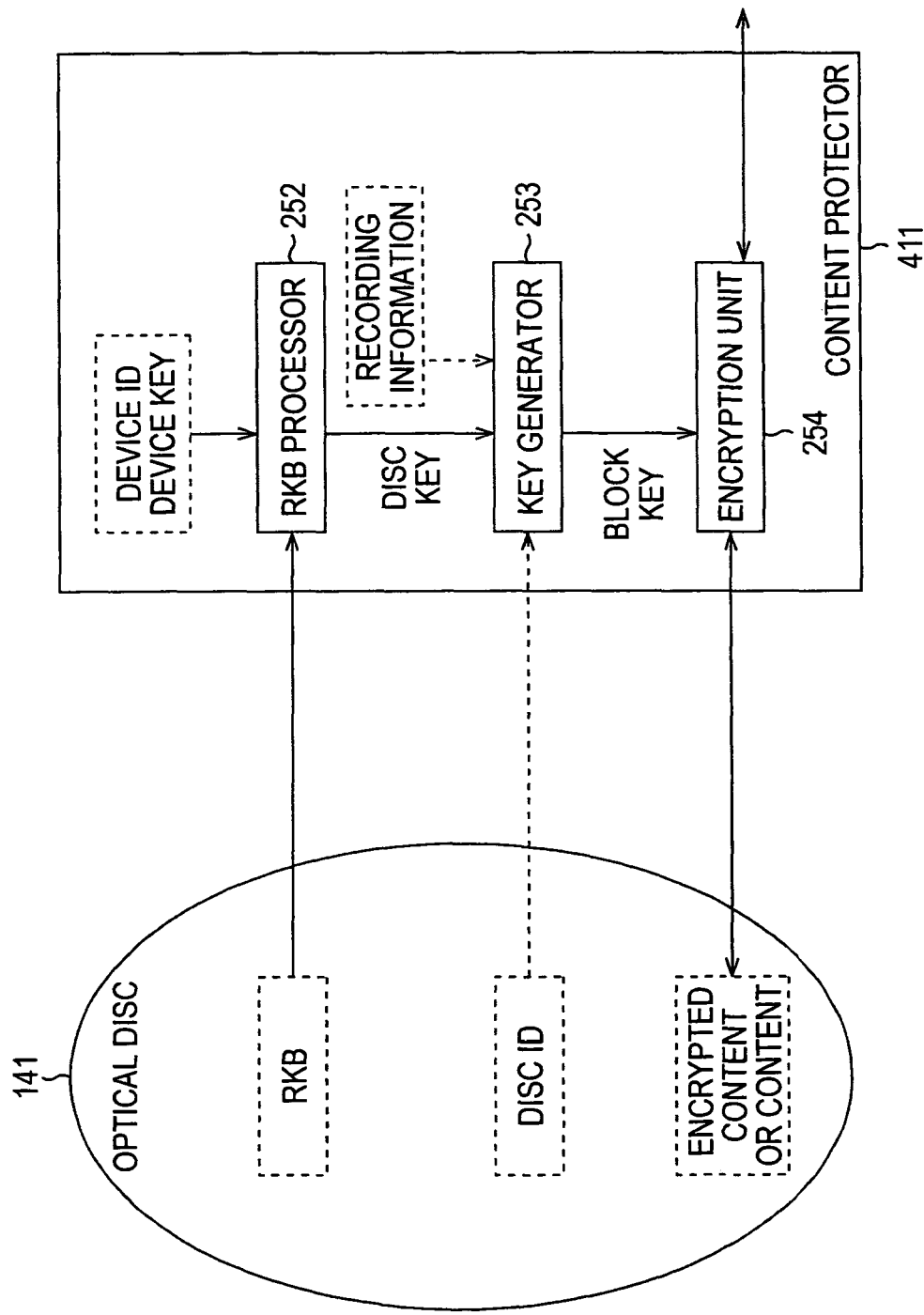
FIG. 25 is a block diagram illustrating an example of the configuration of a content protector 411 shown in FIG. 24.

FIG. 25 illustrates the configuration of the content protector 411 shown in FIG. 24. The configuration of the content protector 411 shown in FIG. 24 is basically similar to that of the content protector 132 shown in FIG. 9. Accordingly, if, for example, the input/output controller 122 determines that the content supplied from the AV board 112 is content to be protected (the recording command of the input content is a command for content to be protected), the encryption unit 254 encrypts the content with a block key for content to be protected, which is generated from the disc key, the disc ID, and recording information.

If the input/output controller 122 determines that the content input from the AV board 112 is content that does not have to be protected (the recording command of the input content is a command for content that does not have to be protected), the encryption unit 254 encrypts the content with a block key for content that does not have to be protected, which is generated from the disc key obtained from at least the RKB. The reason for using the disc key obtained from the RKB is to exclude unauthorized drives. The block key for content to be protected and the block key for content that does not have to be protected are generated by block-key generation processing, which is described below, with reference to FIG. 26, every time the optical disc 141 is installed in the drive 111, and the generated block keys are then stored in a built-in memory (not shown) of the encryption unit 254.

Figure 26:
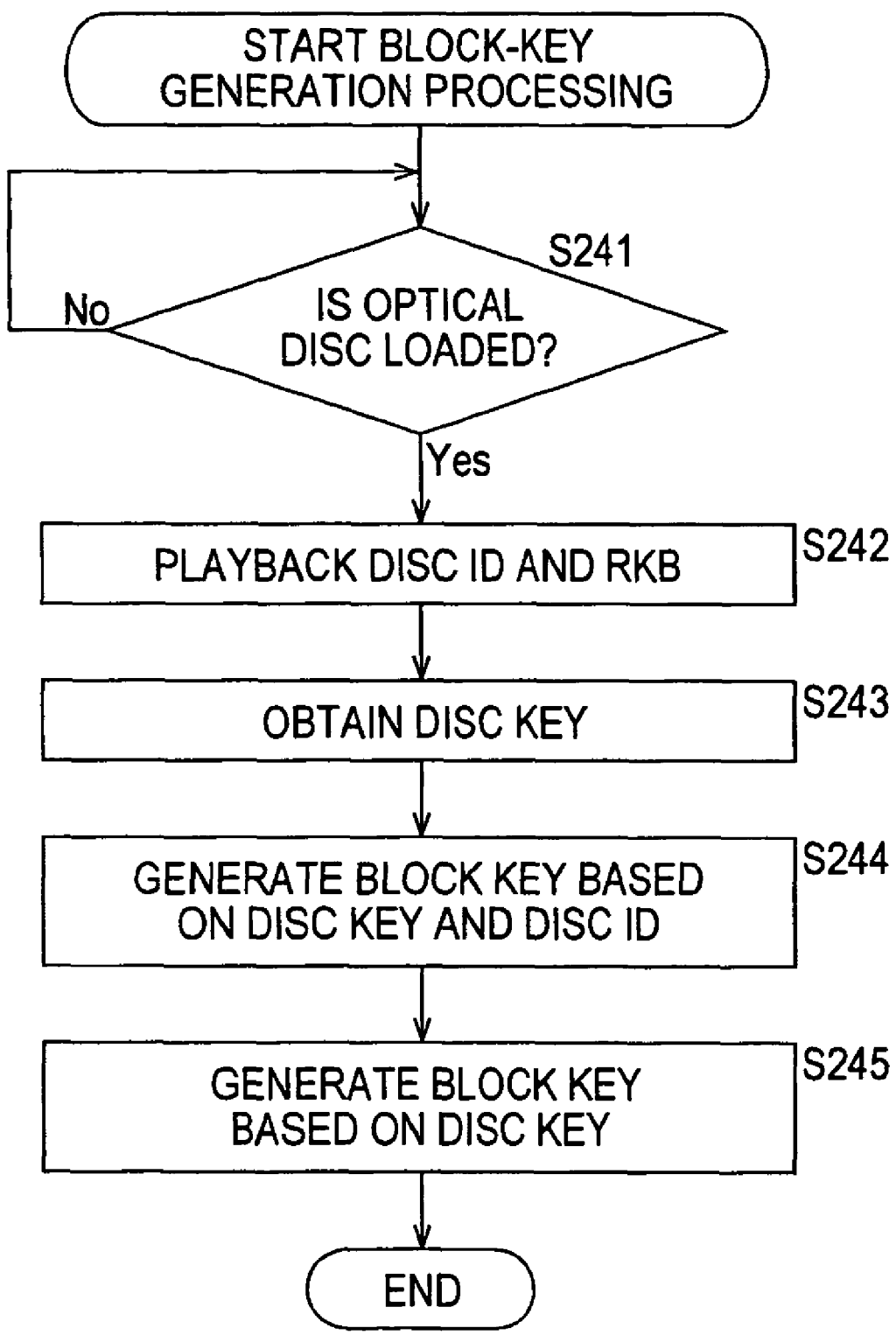
FIG. 26 is a flowchart illustrating block-key generation processing by the drive shown in FIG. 24.

A description is now given of the block-key generation processing performed by the content protector 411 shown in FIG. 24 with reference to the flowchart of FIG. 26.

In step S241, the recording/playback processor 123 waits until the optical disc 141 is loaded into the drive 111. If it is determined in step S241 that the optical disc 141 is loaded, in step S242, the recording/playback processor 123 plays back the disc ID and RKB (disc information) recorded on the optical disc 141 and supplies them to the content protector 411.

In step S243, the RKB processor 252 obtains the disc key by using the supplied RKB, and the device ID and device key stored in the built-in memory. This processing is similar to that of step S123 of FIG. 16, and an explanation thereof is thus omitted.

In step S244, the key generator 253 generates a block key for content to be protected by using the disc ID supplied from the recording/playback processor 123, the disc key generated in step S243, and the recording information of the content protector 411, and stores the generated block key in the built-in memory of the encryption unit 254.

In step S245, the key generator 253 generates a block key for content that does not have to be protected by using at least the disc key generated in step S243, and stores the generated block key in the built-in memory of the encryption unit 254.

As described above, in the content protector 411 shown in FIG. 24, every time the optical disc 141 is installed, two types of block keys for content to be protected and for content that does not have to be protected are generated and stored. Although in the above description the block keys are generated, the disc ID and the disc key for generating block keys may be stored, and, when encrypting content, the block key may be generated according to the protection state of the content.

Figure 27:
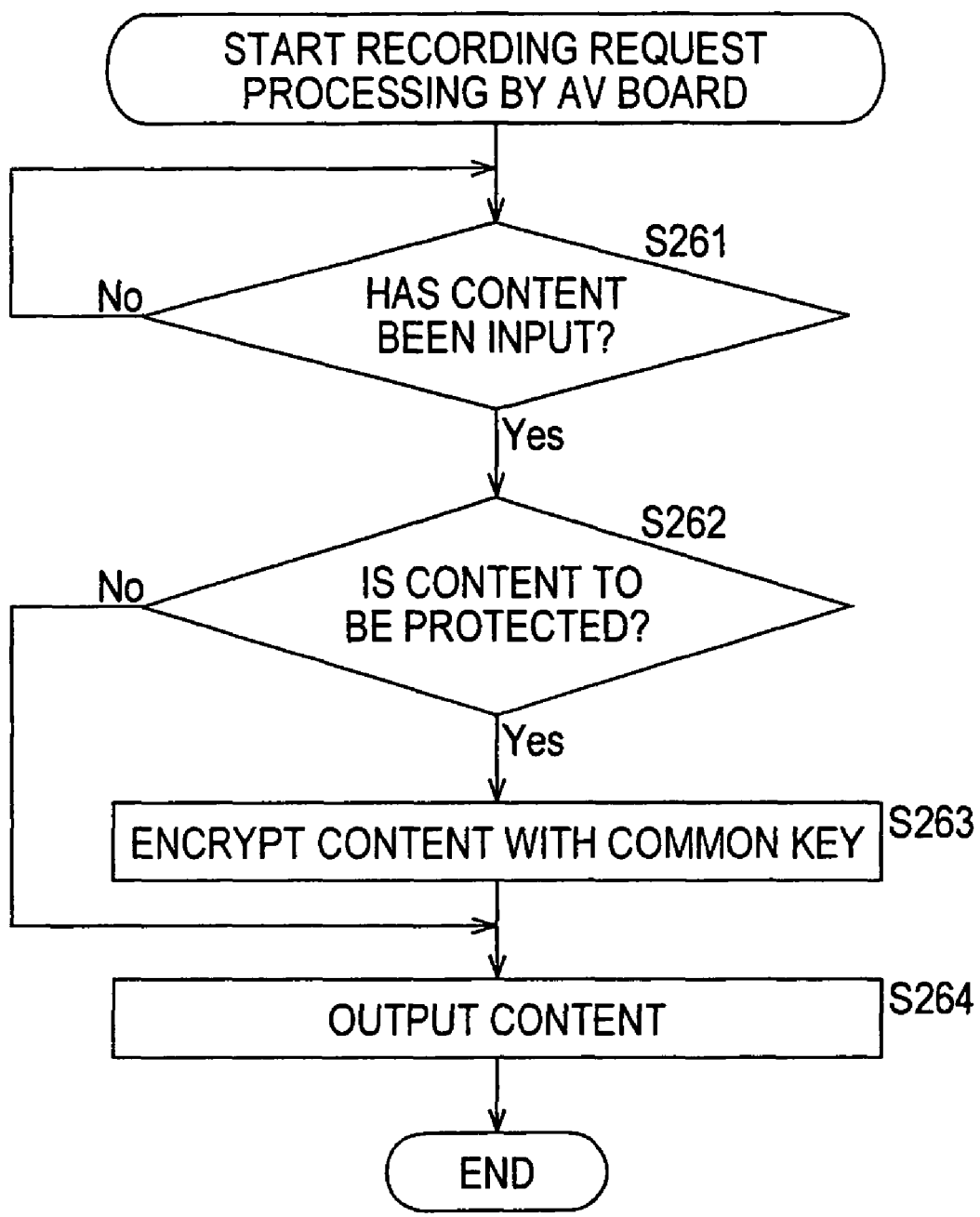
FIG. 27 is a flowchart illustrating recording request processing by the AV board shown in FIG. 24.

A description is now given of recording request processing performed by the AV board 112 shown in FIG. 24 with reference to the flowchart of FIG. 27. The recording request processing shown in FIG. 27 is similar to that of FIG. 15, except that steps S103 and S104 of the recording request processing of FIG. 15 are removed.

In the drive 111, mutual authentication has been conducted to share the common key with the AV board 112 when performing processing after the processing of FIG. 27.

In step S261, the AV content processor 133 receives content. If the AV content processor 133 determines in step S262 that the content is to be protected, in step S263, the mutual authentication unit 131 encrypts the content with the common key shared with the drive 111. In step S264, the encrypted content is output to the drive 111. If it is determined in step S262 that the content does not have to be protected, the content is not encrypted (step S263 is skipped), and is output to the drive 111 in step S264.

Figure 28:
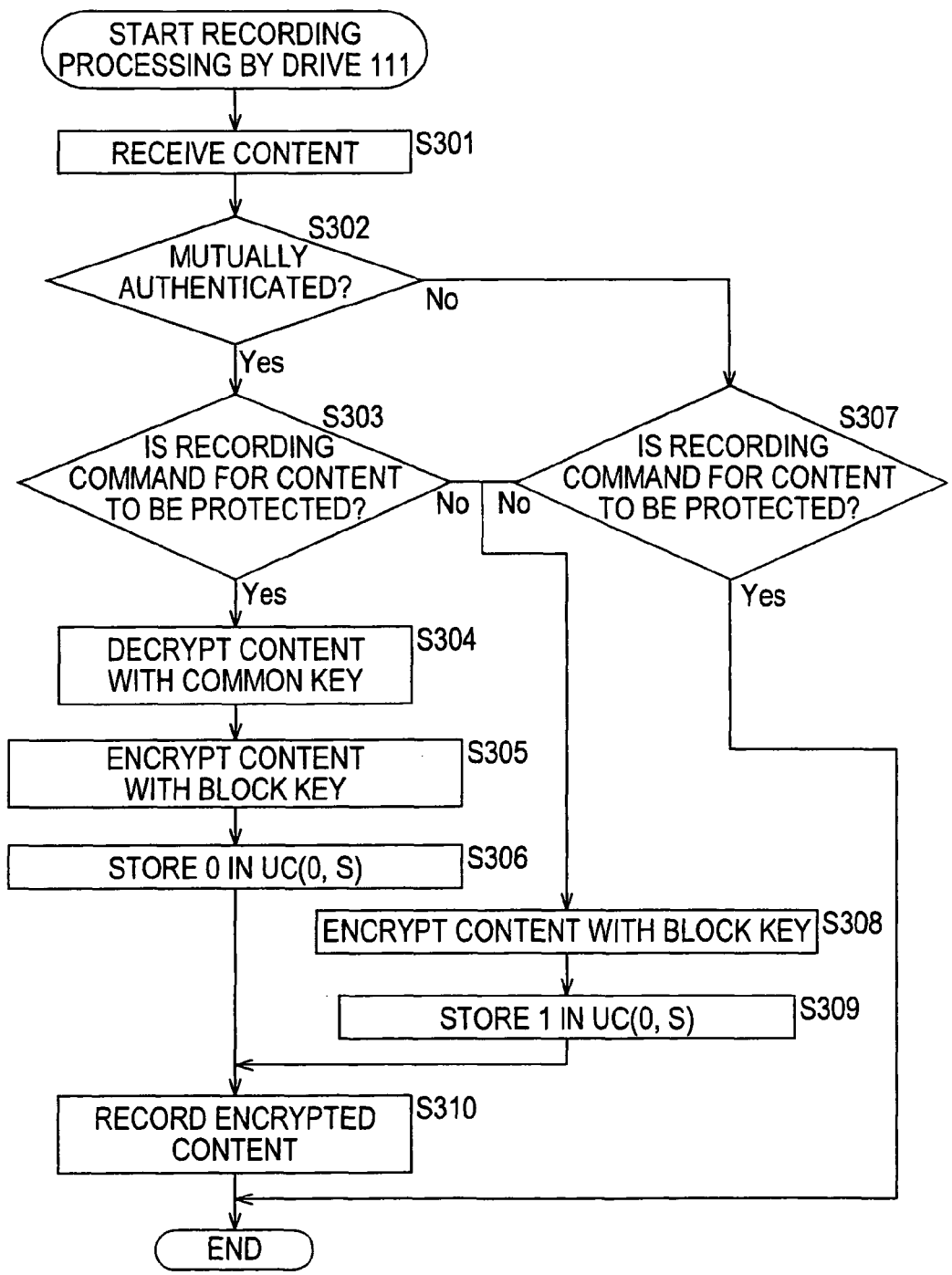
FIG. 28 is a flowchart illustrating recording processing by the drive shown in FIG. 24.

As discussed above, content to be protected is encrypted with the common key shared with the drive 111 and is output from the AV board 112. Content that does not have to be protected is directly output from the AV board 112. Recording processing executed by the drive 111 shown in FIG. 24 in response to this processing is described below with reference to the flowchart of FIG. 28. Steps S301 through S304, steps S306 and S307, and steps S309 and S310 of FIG. 28 are similar to steps S161 through S168 of FIG. 18, and a detailed explanation thereof is thus omitted.

In step S301, the mutual authentication unit 121 of the drive 111 receives the content from the AV board 112 via the bus 113.

In step S302, the input/output controller 122 determines whether the AV board 112 that has sent the content has been mutually authenticated in the drive 111 based on the information from the mutual authentication unit 121. If it is determined that the AV board 112 has been mutually authenticated in the drive 111, in step S303, the input/output controller 122 determines whether the recording command of the input content is for content to be protected on the bus 113 based on whether the content input into the mutual authentication unit 121 is encrypted with the common key.

If it is determined in step S303 that the recording command of the input content is for content to be protected on the bus 113, in step S304, the input/output controller 122 controls the mutual authentication unit 121 to decrypt the received content with the common key shared with the AV board 112 and to supply the content to the content protector 411.

In step S305, the encryption unit 254 encrypts the supplied content by using the block key for content to be protected. This block key for content to be protected has been stored in the memory of the encryption unit 254, as described with reference to FIG. 26. Then, in step S306, the input/output controller 122 controls the recording/playback processor 123 to generate and store protection information "0", which indicates that this content should be protected on the bus 113, in UC(0, S) of the user control data associated with this content. In step S310, the input/output controller 122 controls the recording/playback processor 123 to record the protection information on the optical disc 141 together with the content encrypted with the block key for content to be protected.

On the other hand, for example, content stored in the HDD 114 without a mutual authentication unit is input. In this case, in step S301, content from the HDD 114 is received by the mutual authentication unit 121 via the bus 113. In step S302, it is determined that the device which has sent this content has not been mutually authenticated in the drive 111. In step S307, the input/output controller 122 determines whether the recording command of the input content is a command for content to be protected on the bus 113 based on whether the content input into the mutual authentication unit 121 is encrypted with the common key.

If it is determined in step S303 or S307 that the recording command of the input content is for content that does not have to be protected on the bus 113, the process proceeds to step S308. In step S308, the encryption unit 254 encrypts the content supplied from the mutual authentication unit 121 by using the block key for content that does not have to be protected. This block key for content that does not have to be protected has been stored in the memory of the encryption unit 254, as discussed with reference to FIG. 26.

In step S309, the input/output controller 122 controls the recording/playback processor 123 to generate and store protection information "1", which indicates that this content does not have to be protected on the bus 113, in UC(0, S) of the user control data corresponding to this content. In step S310, the input/output controller 122 controls the recording/playback processor 123 to record the generated protection information on the optical disc 141 together with the content.

If it is determined in step S307 that the recording command of the input content is for content to be protected on the bus 113, an error occurs, and the recording processing by the drive 111 is forcefully terminated.

As discussed above, content to be protected supplied from the authenticated AV board 112 is encrypted with the block key obtained from the disc ID and RKB, and is recorded on the optical disc 141 together with the protection information "0", which means that this content should be protected on the bus 113. In contrast, content that does not have to be protected supplied from the authenticated AV board 112, or content that does not have to be protected from the unauthenticated HDD 114 is encrypted with the block key obtained only from the RKB, and is recorded on the optical disc 141 together with the protection information "1", which indicates that this content does not have to be protected on the bus 113. Content that should be protected from the unauthenticated HDD 114 is not recorded on the optical disc 141.

Figure 29:
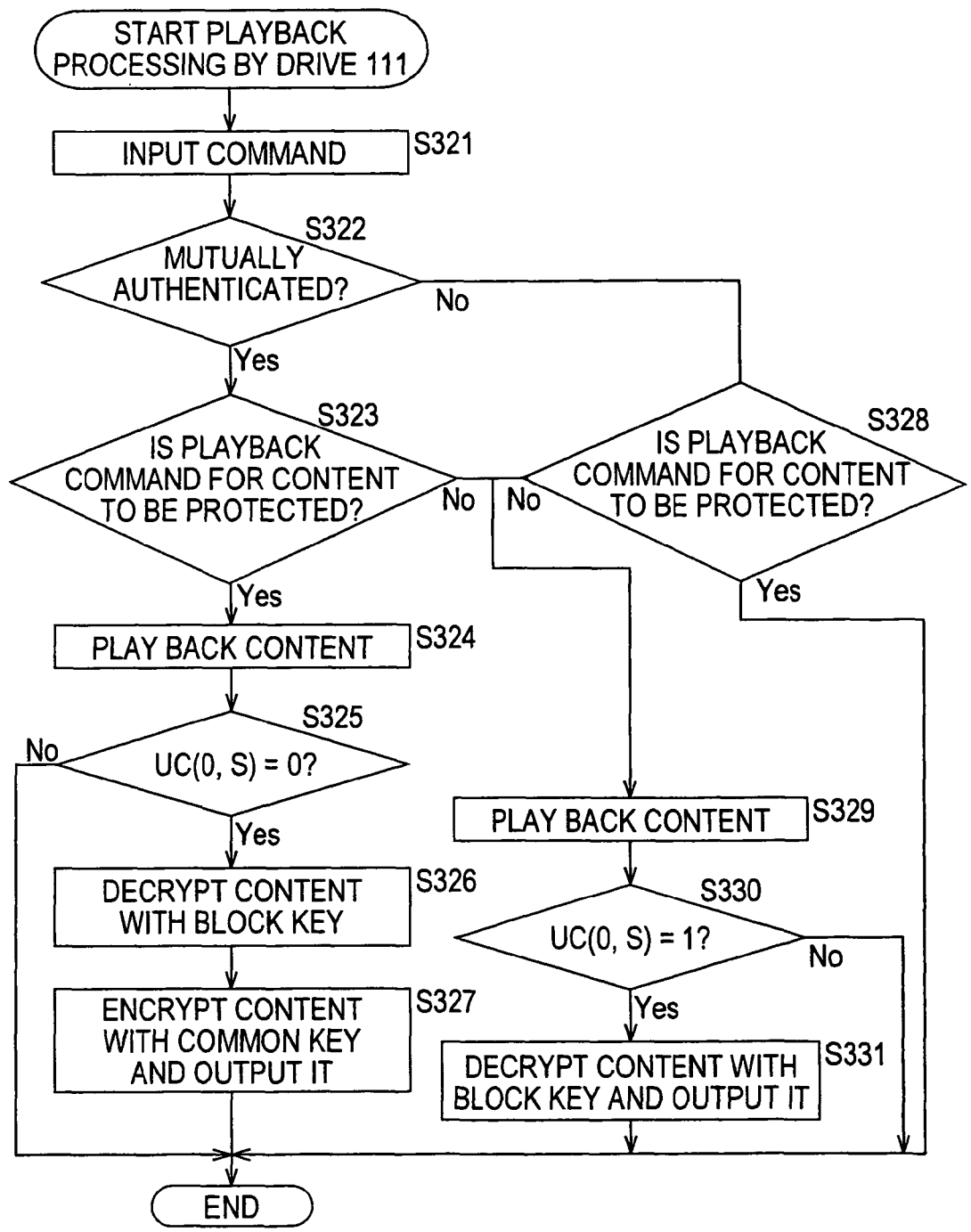
FIG. 29 is a flowchart illustrating playback processing by the drive shown in FIG. 24.

Content playback processing by the drive 111 shown in FIG. 24 is described below with reference to the flowchart of FIG. 29. Steps S321 through S325 and steps S327 through S330 of FIG. 29 are similar to steps S191 through S200 of FIG. 19, and a detailed explanation thereof is thus omitted.

In order to output content to be protected recorded on the optical disc 141 from the output unit 135 of the AV board 112, the user inputs a content playback command into the AV board 112 via the operation input unit. The mutual authentication unit 131 of the AV board 112 sends the playback command to the drive 111 via the bus 113. In step S321, the mutual authentication unit 121 receives the playback command from the AV board 112. If it is determined in step S322 based on the information from the mutual authentication unit 121 that the AV board 112 which receives the content has been mutually authenticated in the drive 111, the input/output controller 122 determines in step S323 whether the playback command from the AV board 112 is for content to be protected.

If it is determined in step S323 that the playback command from the AV board 112 is for content to be protected, in step S324, the recording/playback processor 123 plays back the specified content from the optical disc 141. If the input/output controller 122 determines in step S325 that UC(0, S) of the user control data corresponding to the content is "0", the played back content is found to be content to be protected on the bus 113. In step S326, the encryption unit 254 decrypts the played back content by using the block key for content to be protected stored in the built-in memory. In step S327, the mutual authentication unit 121 encrypts the content supplied from the encryption unit 254 by using the common key shared with the AV board 112, and outputs the content to the AV board 112 via the bus 113.

In contrast, in order to store (record) in the HDD 114 content recorded on the optical disc 141 that does not have to be protected, the user inputs a content playback command into the HDD 114 by operating the operation input unit. The HDD 114 sends the playback command to the drive 111 via the bus 113. Then, in step S321, the mutual authentication unit 121 receives the playback command from the HDD 114. It is then determined in step S322 that the HDD 114 which receives the content is not mutually authenticated based on the information from the mutual authentication unit 121. Then, it is determined in step S328 whether the playback command from the HDD 114 is a command for content to be protected.

If it is determined in step S323 or S328 that the playback command from the HDD 114 is a command for content that does not have to be protected, in step S329, the recording/playback processor 123 plays back the specified content from the optical disc 141. Then, in step S330, the input/output controller 122 determines whether UC(0, S) of the user control data associated with this content is "1". If the input/output controller 122 determines in step S330 that UC(0, S) of the user control data associated with this content is "1", the played back content is found to be content that does not have to be protected on the bus 113. In step S331, the encryption unit 254 decrypts the content with the block key for content that does not have to be protected stored in the built-in memory, and directly outputs the content (as the raw data) to the AV board 112 or the HDD 114 via the mutual authentication unit 121 and the bus 113.

If it is determined in step S325 that UC(0, S) corresponding to the content is not "0", or if it is determined in step S328 that the playback command from the HDD 114 is a command for content to be protected, or if it is determined in step S330 that UC(0, S) corresponding to the content is not "1", an error occurs, and the recording processing by the drive 111 is forcefully terminated.

As discussed above, in response to the playback command from the authenticated AV board 112, content to be protected on the bus 113 is encrypted with the common key and is output to the AV board 112 via the bus 113. Content that does not have to be protected on the bus 113 is directly output (without being encrypted) to the AV board 112 via the bus 113. Then, in step S361 of FIG. 30, which is described below, the content is received by the mutual authentication unit 131 of the AV board 112.

Figure 30:
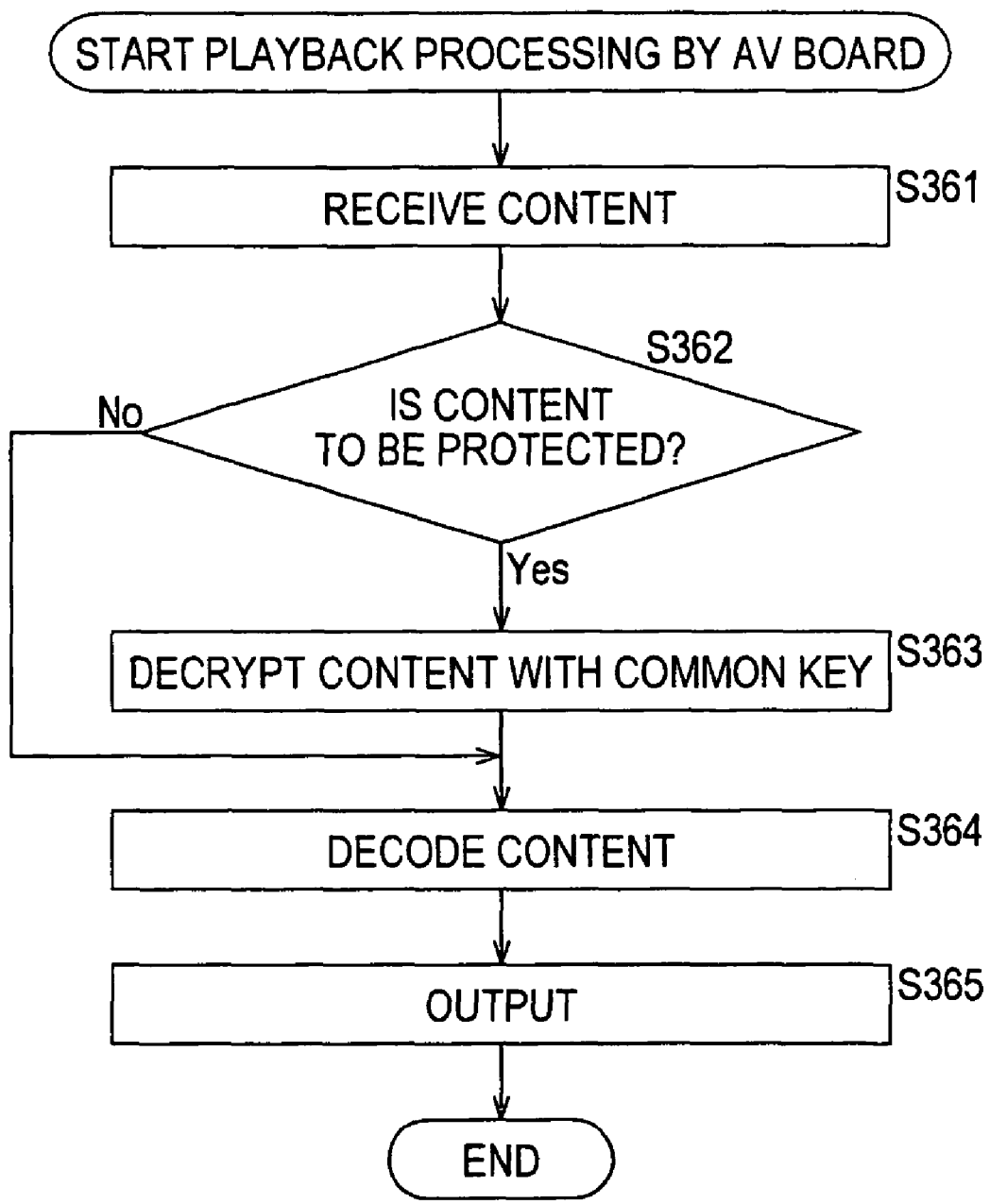
FIG. 30 is a flowchart illustrating playback processing by the AV board shown in FIG. 24.

Playback processing by the AV board 112 corresponding to the content playback processing by the drive 111 shown in FIG. 29 is described below with reference to the flowchart of FIG. 30. The playback processing shown in FIG. 30 is similar to that shown in FIG. 20, except that steps S204 and S205 of the playback processing shown in FIG. 20 are removed.

In step S361, the mutual authentication unit 131 receives the content from the drive 111. If it is determined in step S362 that the content is encrypted with the common key, i.e., the content is to be protected, in step S363, the content is decrypted with the common key shared with the drive 111.

If it is determined in step S362 that the content is not encrypted, i.e., the content does not have to be protected, it is not necessary to decrypt this content. Accordingly, the content passes through the mutual authentication unit 131 and the content protector 132, and thus, step S363 is skipped.

In step S364, the AV content processor 133 decodes the content supplied from the content protector 132 according to, for example, an MPEG method, and plays back the content. In step S365, the output unit 135 outputs the played back content.

As described above, from the AV board 112, which is authenticated with the drive 111, content recorded on the optical disc 141 which is to be protected on the bus 113 and content that does not have to be protected on the bus 113 can be output.

Figure 31:
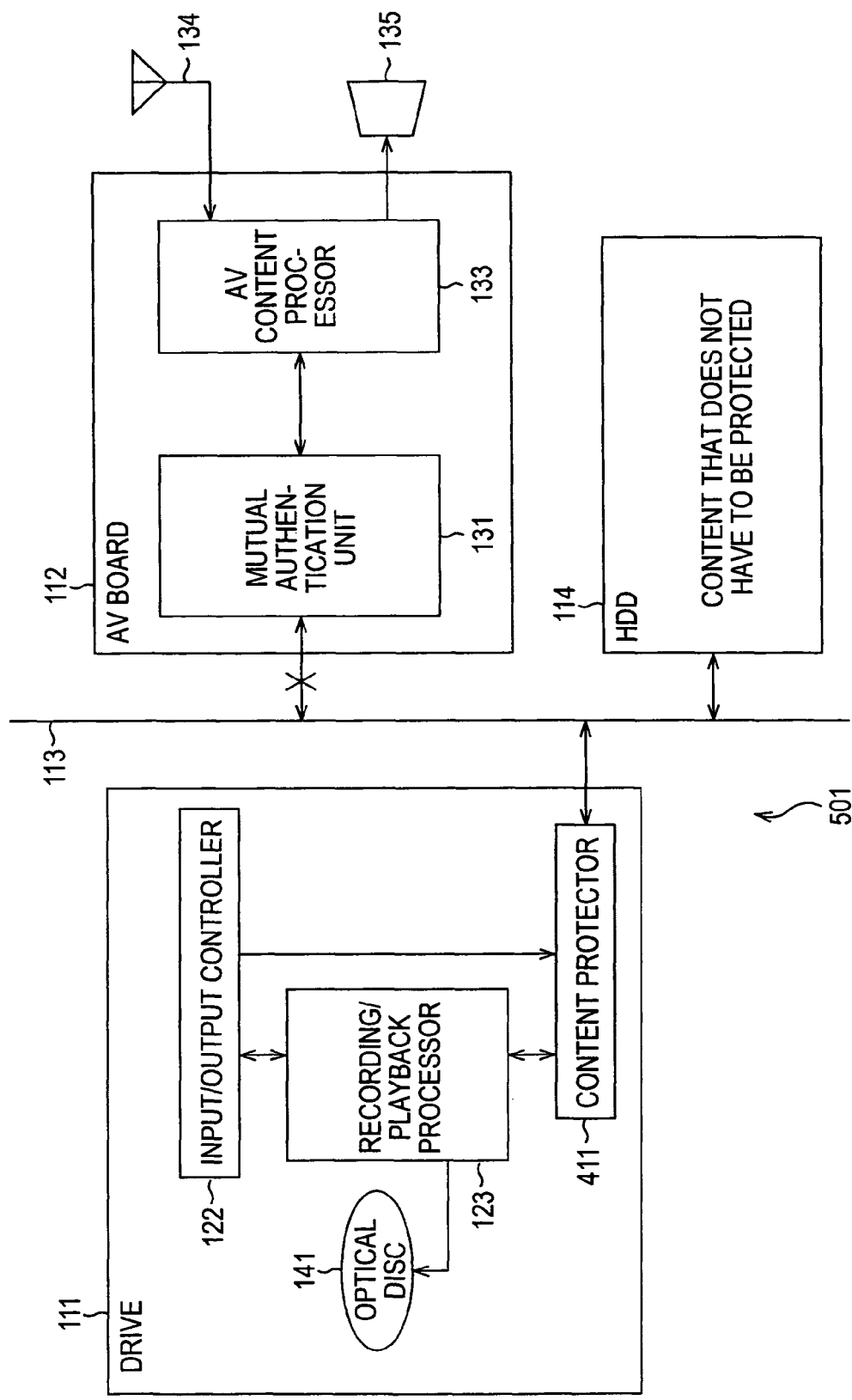
FIG. 31 is a block diagram illustrating another example of the configuration of the recording/playback apparatus shown in FIG. 24.

FIG. 31 illustrates another example of the configuration of the recording/playback apparatus of the present invention. The basic configuration of a recording/playback apparatus 501 shown in FIG. 31 is similar to that of the recording/playback apparatus 401 shown in FIG. 24, except that the mutual authentication unit 121 of the drive ill in the recording/playback-apparatus 401 shown in FIG. 24 is removed from the recording/playback apparatus 501 in FIG. 31.

Accordingly, in the recording/playback apparatus 501 shown in FIG. 31, even though the drive 111 is connected to the bus 113, it is not mutually authenticated in the AV board 112 since the drive 111 is not provided with a mutual authentication function (a common key is not shared). Thus, although content-playback-request processing in response to a request from the AV board 112 is not executed in the drive 111, the drive 111 can send and receive content that does not have to be protected to and from the HDD 114 which is not provided with a mutual authentication function.

Figure 32:
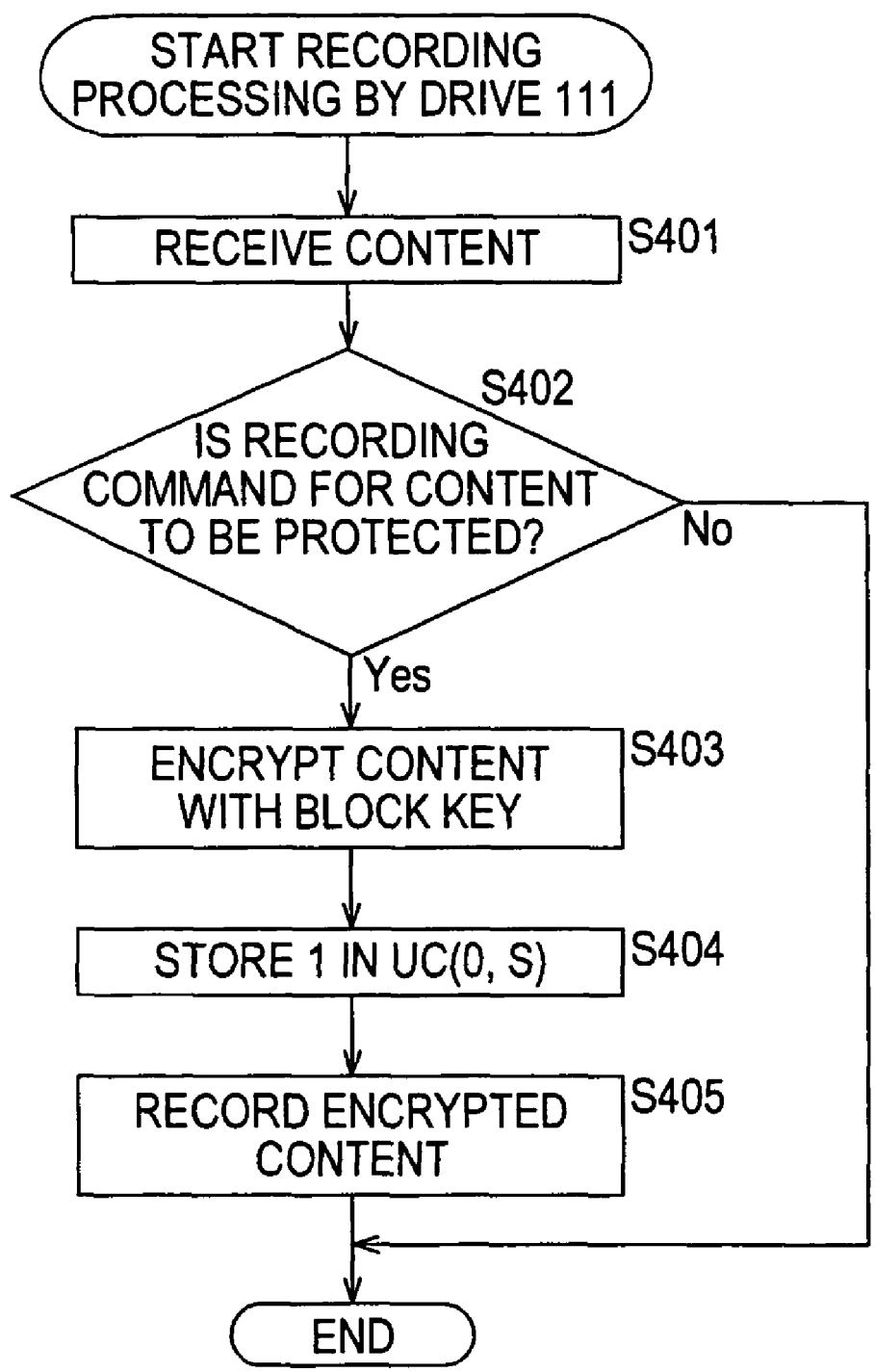
FIG. 32 is a flowchart illustrating recording processing by the drive shown in FIG. 31.

The recording processing performed by the drive 111 of the recording/playback apparatus 501 is described below with reference to the flowchart of FIG. 32. Steps S401 through S405 of FIG. 32 are similar to step S301 and steps S307 through S310 of FIG. 28, and an explanation thereof is thus omitted.

In step S401, the recording/playback processor 123 receives content that does not have to be protected from the HDD 114 via the bus 113. In step S402, the input/output controller 122 determines that the recording command of the input content is not a command for content to be protected on the bus 113 based on whether the content input into the mutual authentication unit 121 is encrypted with the common key. In step S403, the encryption unit 254 encrypts the content by using the block key for content that does not have to be protected.

In step S404, the recording/playback processor 123 generates and stores protection information "1", which indicates that this content does not have to be protected on the bus 113, in UC(0, S) of the user control data corresponding to the content. In step S405, the recording/playback processor 123 records the protection information "1" on the optical disc 141 together with the content supplied from the HDD 114 that does not have to be protected.

If content encrypted with the common key is input, and if it is determined in step S402 that the recording command of the input content is a command for content to be protected on the bus 113, an error occurs, and the recording processing by the drive 111 is forcefully terminated. If the content is not encrypted with the common key, but is encrypted by another method, it may be determined that the content does not have to be protected on the bus 113.

As discussed above, content that does not have to be protected supplied from the HDD 114 without a mutual authentication function is recorded on the optical disc 141.

Figure 33:
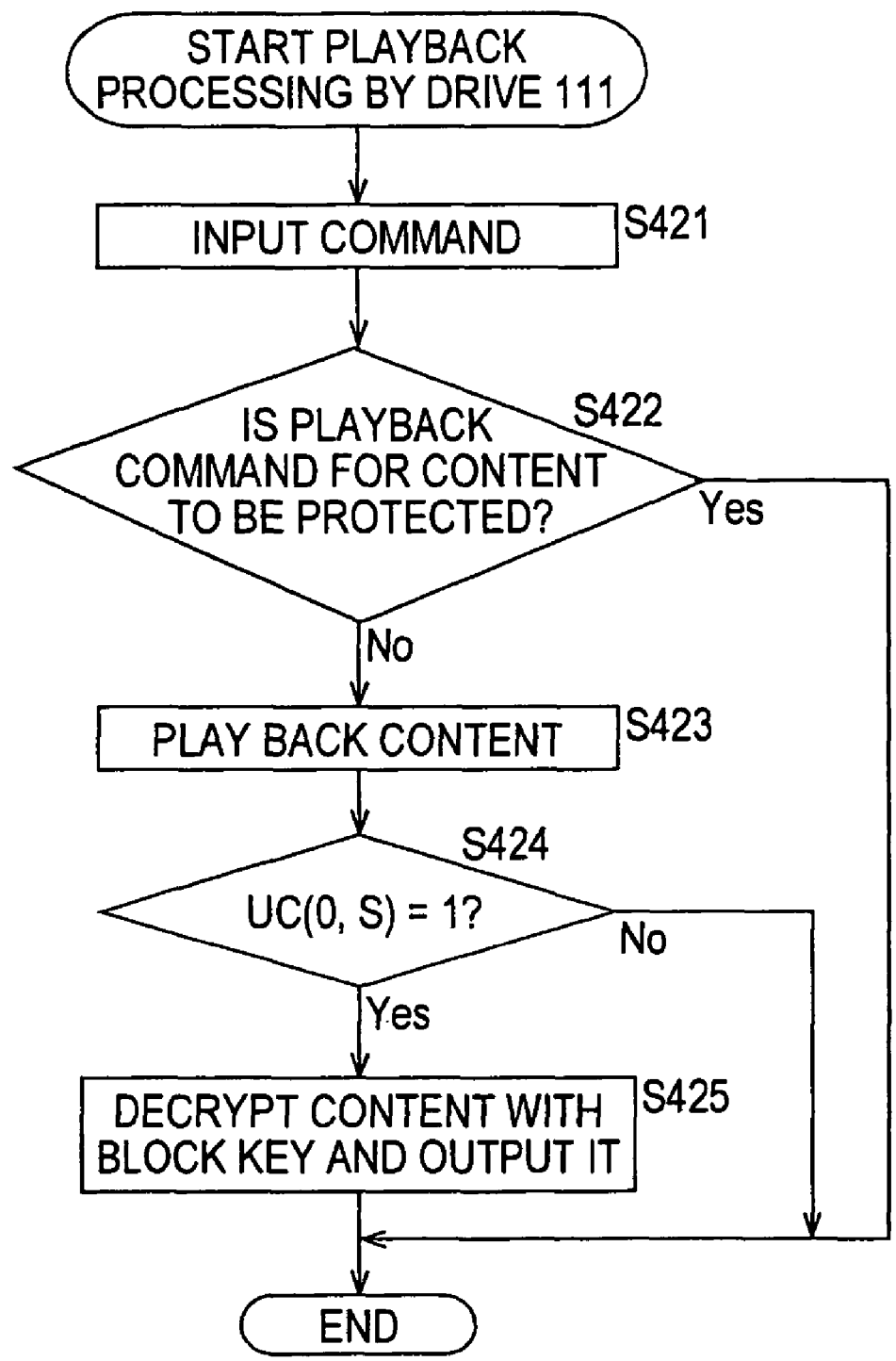
FIG. 33 is a flowchart illustrating playback processing by the drive shown in FIG. 31.

A description is now given of playback processing performed by the drive 111 in the recording/playback apparatus 501 with reference to the flowchart of FIG. 33. Steps S421 through S425 of FIG. 33 are similar to step S321 and steps S328 through S331 of FIG. 29, and a detailed explanation thereof is thus omitted.

For example, in order to store (record) in the HDD 114 content recorded on the optical disc 141 that does not have to be protected, the user inputs a content playback command into the HDD 114 via the operation input unit. The HDD 114 sends the playback command to the drive 111 via the bus 113. In step S421, the playback command from the HDD 114 is input, and if it is determined in step S422 that the playback command from the HDD 114 is for content that does not have to be protected, the process proceeds to step S423. In step S423, the recording/playback processor 123 plays back the specified content from the optical disc 141.

If the input/output controller 122 determines in step S424 that UC(0, S) of the user control data corresponding to the content is "1", it means that the played back content is found to be content that does not have to be protected on the bus 113. In step S425, the encryption unit 254 decrypts the content by using the block key for content that does not have to be protected, and directly outputs the content (as the raw data) to the AV board 112 or the HDD 114 via the mutual authentication unit 121 and the bus 113.

In contrast, if it is determined in step S422 that the command from the HDD 114 is a playback command for content to be protected, or if it is determined in step S424 that UC(0, S) corresponding to the content is not "1", an error occurs since content to be protected cannot be output to the unauthenticated HDD 114. Then, the recording processing by the drive 111 is forcefully terminated.

In this manner, in response to the playback command from the HDD 114, the protection information "1" is played back, and the played back content that does not have to be protected is directly output (without being encrypted) to the HDD 114 via the bus 113. Accordingly, content that does not have to be protected on the bus 113 is not encrypted, and thus, it can be supplied to the HDD 114 and stored.

Even if content from the unauthenticated HDD 114 is indicated as content to be protected, it is not recognized as content to be protected in the drive 111. Only content that does not have to be protected can be processed in the drive 111. Accordingly, unauthenticated storage devices that handle only copy free content can be efficiently utilized.

Although in the above description the recording medium is the optical disc 141, it may be another type of recording medium, for example, a memory card (registered).

A series of the above-described processing may be executed by hardware or software. In this case, the recording/playback apparatus 101 shown in FIG. 4, the recording/playback apparatus 301 shown in FIG. 21, the recording/playback apparatus 401 shown in FIG. 24, or the recording/playback apparatus 501 shown in FIG. 31, can be formed by, for example, a recording/playback apparatus 601 shown in FIG. 34.

In FIG. 31, a CPU (Central Processing Unit) 611 executes various types of processing according to programs stored in a ROM (Read Only Memory) 612 or programs loaded into a RAM (Random Access Memory) 613 from an HDD 619. In the RAM 613, data necessary for the CPU 611 to perform various types of processing is suitably stored.

The CPU 611, the ROM 612, and the RAM 613 are connected to each other via a bus 614. An input/output interface 615 is also connected to the bus 614.

The input/output interface 615 is connected to an AV board 616 for controlling the input/output of content, an input unit 617 including, for example, a keyboard and a mouse, an output unit 618 including, for example, a display device such as a CRT (Cathode Ray Tube) or LCD (Liquid Crystal Display), and a speaker, the HDD 619, and a communication unit 620 including, for example, a modem or a terminal adapter. The communication unit 620 performs communication processing via the bus or a network (not shown).

A drive 630 is connected to the input/output interface 615 when necessary. A magnetic disk 631, an optical disc 632, a magneto-optical disk 633, or a semiconductor memory 634 is suitably loaded into the drive 630, and a computer program read from such a recording medium is installed into the HDD 619 if necessary.

If the above-described series of processing is executed by software, a corresponding software program is installed via a network or a recording medium into a computer built into dedicated hardware or into a computer that can execute various functions by installing various programs thereinto, for example, a general-purpose computer.

Figure 34:
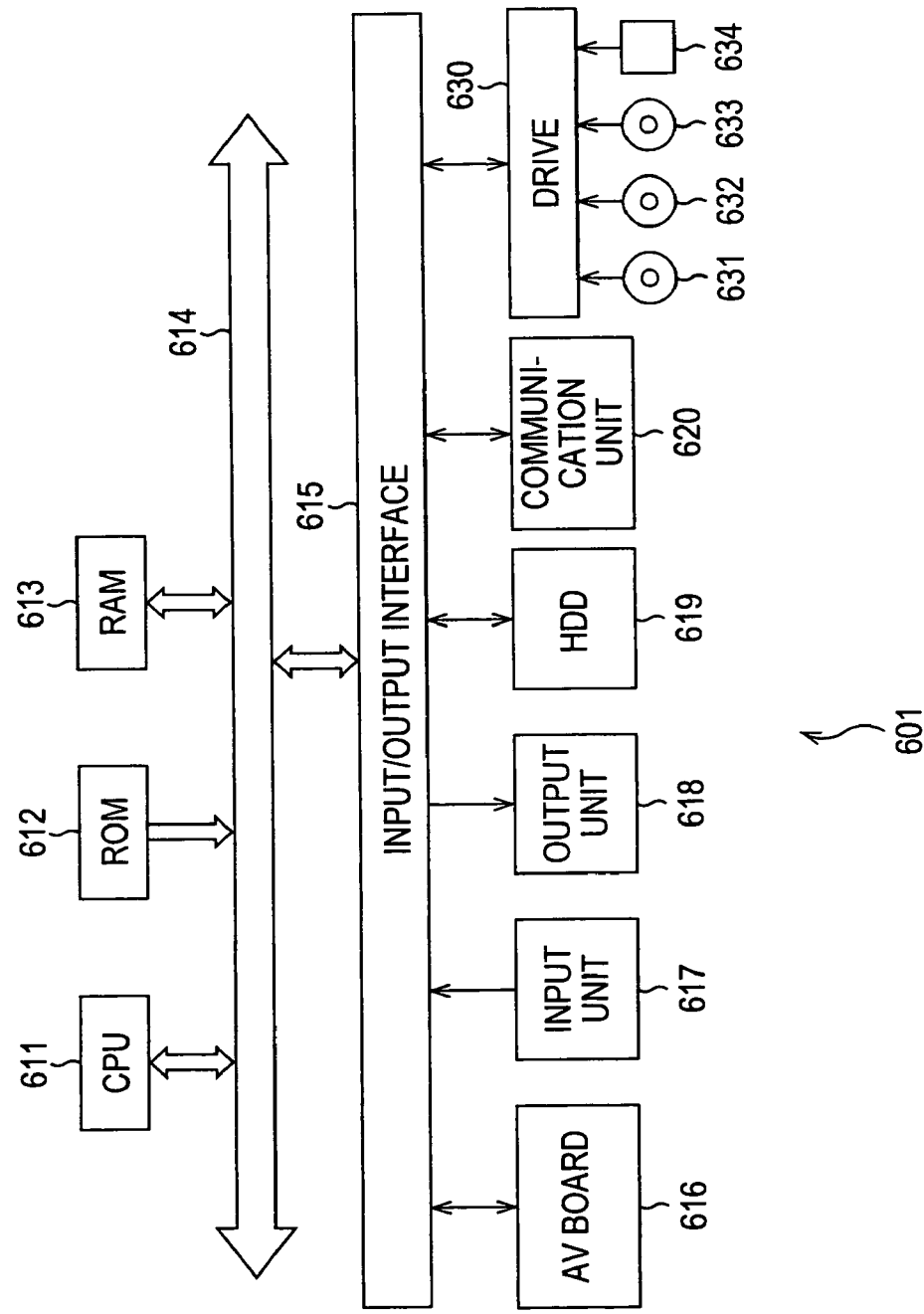
FIG. 34 is a block diagram illustrating a further example of the configuration of the recording/playback apparatus of the present invention.

This recording medium includes a package medium, recording the program therein, consisting of the magnetic disk 631 (including floppy disks), the optical disc 632 (including CD-ROM (Compact Disk—Read Only Memory) and DVD (Digital Versatile Disk)), the magneto-optical disk 633 (including MD (Mini-Disk) (registered)), or the semiconductor memory 634, as shown in FIG. 34, which is distributed for providing the program to the user separately from the apparatus. The recording medium also includes the ROM 612 or the HDD 619 recording the program therein, which is provided to the user while being integrated into the apparatus.

If the optical disc 141 shown in FIG. 4 for recording or playing back content and protection information is a disk recording medium, for example, a DVD, a CD-R or another type of optical disc, an MD or another type of magneto-optical disk, or a magnetic disk, information is recorded by forming, based on the recording waveform of data, pits or marks on a "track" concentrically or spirally set on the disk surface.

For example, in media which record data by pressing, such as in CD-ROM or DVD-ROM, pits, which are physical dents, are formed on the surface. In contrast, in write-once or rewritable media, such as in CD-R, CD-RW, DVD-R, DVD-RW, or DVD-RAM, instead of forming dents, laser light is applied, and then, a chemical change occurs in the phase change film in the media, thereby forming marks instead of dents.

When playing back recorded data, laser light applied from the head to read the data is reflected by the surface of a medium, and then, the reflected light changes according to the presence or absence of pits or marks, thereby playing back the data.

Methods for identifying recorded data include the "mark-position recording method" in which the presence or absence of pits represents bit data, and the "mark-edge recording method" in which the presence of pits inverts bits.

In the second method, pits which are read with a constant reflectance factor are identified as "0", and pits which change the reflectance factor in the pits are identified as "1". This method contributes to decreasing the pit length by reducing the loss in the track when recording data.

The methods for recording and playing back information on and from a disk recording medium, for example, the magnetic disk 631, the optical disc 632, the magneto-optical disk 633, the ROM 612, or the HDD 619, described with reference to FIG. 34, are similar to those of the optical disc 141.

Steps forming the program to be recorded on the recording medium may be executed in chronological order described in this specification. However, they may be executed concurrently or individually.

In this specification, the system represents the entirety of an apparatus formed of a plurality of devices.

INDUSTRIAL APPLICABILITY

As is seen from the foregoing description, according to the present invention, content can be flexibly protected according to whether or not the content should be protected. Additionally, according to the present invention, unauthorized copying of content can be prevented. Data can also be stored in storage devices of a PC.

The invention claimed is:

1. A recording system in which a host device and a recording drive are connected via a bus,
said host device comprising
a determination module configured to determine whether input content is to be protected by an encryption process when transferred over the bus,
said recording drive comprising
a recording module configured to record user data interspersed with user control data in a unit of physical cluster on a recording medium,
wherein the content is recorded in the user data, and protection information is recorded in the user control data, the protection information consisting of a one-bit flag indicating whether the content is to be protected by the encryption process when being transmitted on the bus based on a determination result obtained by said determination module,
said host device further comprises a first encryption module configured to encrypt the content using a recording medium key of the recording medium regardless of whether said determination module determines that the content is to be protected, and
said host device further comprises a second encryption module configured to encrypt the content using a key common to both the host device and the recording drive before being sent to the bus when said determination module determines that the content is to be protected.

2. A recording system according to claim 1, wherein the unit is 2048 bytes.

3. A recording system according to claim 1, wherein each of said host device and said recording drive further comprises an authentication module configured to authenticate each other.

4. A recording system according to claim 1, wherein said second encryption module is configured to prohibit the content from being encrypted before being sent to the bus when said determination module determines that the content is not to be protected.

5. The recording system according to claim 1, wherein the physical cluster is grouped into 496 recording frames having 1932 channel bits.

6. The recording system according to claim 5, wherein 20 channel bits of a first data set in the physical cluster are set as a synchronizing bit group.

7. The recording system according to claim 1, wherein the physical cluster comprises 42 sets, each set including 45 channel bit data and one channel bit control data.

8. A recording method for a recording system in which a host device and a recording drive are connected via a bus, comprising:
determining, at said host device, whether input content is to be protected by an encryption process when transferred over the bus;
recording user data interspersed with user control data in a unit of physical cluster on a recording medium, wherein the content is recorded in the user data, and protection information is recorded in the user control data, the protection information consisting of a one-bit flag indicating whether the content is to be protected by the encryption process when being transmitted on the bus based on a determination result;
encrypting, at said host device, the content by using a recording medium key of the recording medium regardless of whether it is determined that the content is to be protected, and
encrypting, at said host device, the content using a key common to both the host device and the recording drive before being sent to the bus when it is determined that the content is to be protected.

9. The recording method of claim 8, wherein the unit is 2048 bytes.

10. The recording method of claim 8, wherein the physical cluster is grouped into 496 recording frames having 1932 channel bits.

11. The recording method of claim 10, wherein 20 channel bits of a first data set in the physical cluster are set as a synchronizing bit group.

12. The recording method of claim 8, wherein the physical cluster comprises 42 sets, each set including 45 channel bit data and one channel bit control data.

13. A recording system in which a host device and a recording drive are connected via a bus,
said host device comprising
a processor configured to determine whether input content is to be protected by an encryption process when the content is transferred via the bus,
said recording drive comprising:
a recording unit configured to record user data interspersed with user control data in a unit of physical cluster on a recording medium,
wherein the content is recorded in the user data, and protection information is recorded in the user control data, the protection information consisting of a one-bit flag indicating whether the content is to be protected by the encryption process when being transmitted on the bus based on a determination result obtained by said processor,
said host device further comprises first encryption unit configured to encrypt the content by using a recording medium key of the recording medium regardless of whether said processor determines that the content is to be protected, and
said host device further comprises second encryption unit configured to encrypt the content using a key common to both the host device and the recording drive before being sent to the bus when the processor determines that the content is to be protected.

14. The recording system of claim 13, wherein the unit is 2048 bytes.

15. The recording system of claim 13, wherein the physical cluster is grouped into 496 recording frames having 1932 channel bits.

16. The recording system of claim 15, wherein 20 channel bits of a first data set in the physical cluster are set as a synchronizing bit group.

17. The recording system of claim 13, wherein the physical cluster comprises 42 sets, each set including 45 channel bit data and one channel bit control data.

* * * * *